US010156185B2

(12) United States Patent
Hesselink et al.

(10) Patent No.: US 10,156,185 B2
(45) Date of Patent: Dec. 18, 2018

(54) SECURE CONTROL SYSTEM FOR MULTISTAGE THERMO ACOUSTIC MICRO-CHP GENERATOR

(71) Applicant: Nirvana Energy Systems, Inc., Portola Valley, CA (US)

(72) Inventors: Lambertus Hesselink, Atherton, CA (US); Geoffrey A. Bruder, Parma Heights, OH (US); Mark A. Pickens, Brunswick, OH (US); Rajesh Batra, Los Altos, CA (US); Neil W. Troy, Santa Clara, CA (US); Rodger W. Dyson, Jr., Elyria, OH (US)

(73) Assignee: Nirvana Energy Systems, Inc., Portola Valley, CA (US)

( * ) Notice: Subject to any disclaimer, the term of this patent is extended or adjusted under 35 U.S.C. 154(b) by 56 days.

(21) Appl. No.: 14/950,945

(22) Filed: Nov. 24, 2015

(65) Prior Publication Data
US 2016/0146153 A1   May 26, 2016

Related U.S. Application Data

(60) Provisional application No. 62/083,666, filed on Nov. 24, 2014, provisional application No. 62/083,660, filed on Nov. 24, 2014, provisional application No. 62/083,812, filed on Nov. 24, 2014, provisional application No. 62/083,628, filed on Nov. 24, 2014,
(Continued)

(51) Int. Cl.
| F02G 5/00 | (2006.01) |
| F02B 71/04 | (2006.01) |
| F02B 63/04 | (2006.01) |
| H02K 53/00 | (2006.01) |
| F02G 1/06 | (2006.01) |

(52) U.S. Cl.
CPC ............ *F02B 71/04* (2013.01); *F02B 63/043* (2013.01); *F02G 1/06* (2013.01); *H02K 53/00* (2013.01); *F02G 2243/54* (2013.01); *F05D 2260/962* (2013.01); *F05D 2270/14* (2013.01); *Y02E 20/14* (2013.01)

(58) Field of Classification Search
CPC .......... F02B 71/04; F02B 63/043; F02G 1/06; F02G 2243/54; F05D 2260/962; F05D 2270/14; Y02E 20/14
USPC ................................................................. 290/2
See application file for complete search history.

(56) References Cited

U.S. PATENT DOCUMENTS

| 8,205,459 B2 | 6/2012 | Garner et al. |
| 8,227,928 B2 | 7/2012 | Garmer et al. |

(Continued)

*Primary Examiner* — Sean Gugger
(74) *Attorney, Agent, or Firm* — Lumen Patent Firm

(57) ABSTRACT

A method of controlling facility power requirements using a thermoacoustic power device is provided that includes determining energy assets in a facility, controlling the energy assets using an appropriately programmed controller across a network having a security system protocol, monitoring outside temperatures and weather, measuring usage of the energy assets using a temperature sensor or an electrical usage sensor to a load-response signal of an on/off operation and usage of the energy assets to identify a specific energy asset by the controller to determine aggregate energy needs of the energy assets, and using a thermoacoustic power device controlled by the controller to generate electricity and heat according to the monitored temperature, weather and energy assets.

39 Claims, 12 Drawing Sheets

Related U.S. Application Data provisional application No. 62/083,633, filed on Nov. 24, 2014, provisional application No. 62/083,642, filed on Nov. 24, 2014, provisional application No. 62/083,648, filed on Nov. 24, 2014.

(56) References Cited

U.S. PATENT DOCUMENTS

| | | | |
|---|---|---|---|
| 2005/0016171 A1* | 1/2005 | Fellows | F02G 1/0435 60/520 |
| 2007/0087756 A1* | 4/2007 | Hoffberg | G06Q 10/0631 455/450 |
| 2007/0175217 A1* | 8/2007 | Fellows | H01L 37/04 60/645 |
| 2008/0157938 A1* | 7/2008 | Sutardja | G08C 19/00 340/12.32 |
| 2009/0184604 A1* | 7/2009 | Symko | F02G 1/043 310/334 |
| 2009/0195349 A1* | 8/2009 | Frader-Thompson | G01D 4/002 340/3.1 |
| 2010/0001535 A1* | 1/2010 | Kimura | F01N 13/0093 290/1 A |
| 2011/0025073 A1* | 2/2011 | Garner | F02G 1/043 290/40 E |
| 2011/0252809 A1* | 10/2011 | Aldraihem | F02G 1/043 62/3.1 |
| 2011/0252811 A1* | 10/2011 | Aldraihem | F02G 1/043 62/3.1 |
| 2011/0265493 A1 | 11/2011 | Schwartz et al. | |
| 2011/0265505 A1 | 11/2011 | Schwartz et al. | |
| 2013/0219879 A1 | 8/2013 | Dyson et al. | |
| 2014/0083094 A1* | 3/2014 | Elison | H01L 23/467 60/527 |
| 2014/0300182 A1* | 10/2014 | James | B60R 16/03 307/10.1 |
| 2016/0177802 A1* | 6/2016 | Courtes | F01N 5/02 60/320 |

* cited by examiner

US 10,156,185 B2

SECURE CONTROL SYSTEM FOR MULTISTAGE THERMO ACOUSTIC MICRO-CHP GENERATOR

CROSS-REFERENCE TO RELATED APPLICATIONS

This application claims priority from U.S. Provisional Patent Application 62/083,666 filed Nov. 24, 2014, which is incorporated herein by reference. This application claims priority from U.S. Provisional Patent Application 62/083,660 filed Nov. 24, 2014, which is incorporated herein by reference. This application claims priority from U.S. Provisional Patent Application 62/083,812 filed Nov. 24, 2014, which is incorporated herein by reference. This application claims priority from U.S. Provisional Patent Application 62/083,628 filed Nov. 24, 2014, which is incorporated herein by reference. This application claims priority from U.S. Provisional Patent Application 62/083,633 filed Nov. 24, 2014, which is incorporated herein by reference. This application claims priority from U.S. Provisional Patent Application 62/083,642 filed Nov. 24, 2014, which is incorporated herein by reference. This application claims priority from U.S. Provisional Patent Application 62/083,648 filed Nov. 24, 2014, which is incorporated herein by reference.

FIELD OF THE INVENTION

The present invention relates generally to residential, consumer, professional and commercial power systems. More particularly, the present invention relates to multistage thermo-acoustical power generation.

BACKGROUND OF THE INVENTION

As centralized power plants fail to meet the growing energy needs worldwide due to outdated grid infrastructure, emissions restrictions, nuclear waste disposal restrictions, and limited availability of traditional coal supplies, the cost and availability of electricity become an issue during peak loads.

Conventional residential and commercial power systems, such as internal combustion, free-piston Stirling, microturbine, fuel cells, and the like, are typically unreliable, require maintenance, or produce noise and pollution when operated. Moreover, it is difficult to move these devices into a house or office because they are large and heavy.

Stirling cycle heat engines have been built and tested since the 1800s, though no major successful product has yet been realized using this core technology. Within the past several decades, the work of Los Alamos National Laboratory (LANL), Palo Alto Research Center (PARC), and the National Aeronautics and Space Administration (NASA), and Nirvana Energy Systems (NES) have advanced this technology through an offshoot called Thermoacoustics. These engines operate utilizing the Stirling cycle to convert heat energy into mechanical energy through means of external combustion or energy harvesting, but are able to operate with fewer moving parts. These devices have promised advancement to the now traditional free-piston Stirling device by reducing complexity and cost. However, typical toroidal thermoacoustic engines have lower efficiency and difficult geometry for high volume manufacturing. These setbacks have been overcome through the work of PARC, NASA, and NES by way of current state of the art technology; electronic feedback thermoacoustic engines. Called "Thermo-Electric-Acoustic Engine" by PARC, "Alpha-STREAM" by NASA, and "Thermo Acoustic Power Stick" (TAPS) by NES, these devices have all used a phase delayed power feedback from an electric-acoustic receiver to drive an electric-acoustic driver. U.S. Pat. No. 8,205,459, U.S. Pat. No. 8,227,928, and patent applications 20110265505, 20110265493, 20130219879 and PCT/US13/24749 describe thermoacoustic devices.

The prior state of the art utilized a capacitor or inductor to phase shift voltage and current as power was collected from the electrical generation end of the device and delivered to the electrical to mechanical side of the device. This phase delay technique is susceptible to the shifting resistive component of the load, as well as additional capacitive or inductive loads that would be added as the device's power was utilized. The control methodology previously utilized, was forced to compensate for alternating current (AC) connections to the grid and other loads in real time in order to maintain stable engine operation.

What is needed is a secure control system for a power system with no hot moving parts that produces electricity for the home and uses waste heat for domestic purposes.

SUMMARY OF THE INVENTION

To address the needs in the art, a method of controlling facility power requirements using a thermoacoustic power device is provided that includes determining energy assets in a facility, where power requirements and a unique electrical signature of the energy assets are identified, where the energy assets can include electrical appliances, heating appliances, and cooling appliances. The method further includes controlling the energy assets using an appropriately programmed controller, where the controller controls the energy assets across a network comprising, wherein the network can include an internet, and extranet of an intranet, where the controller includes a security system protocol, then monitoring outside temperatures and weather using sensors controlled by the controller and receiving weather data via the network, measuring usage of the energy assets using sensors, where the sensors include a temperature sensor or an electrical usage sensor, where the electrical usage sensor measures a load-response signal of an on/off operation of the energy assets, where the load-response signal identifies a specific energy asset by the controller, where the controller monitors energy usage of the energy assets, where the controller uses the monitored temperature, the monitored weather and the monitored energy usage of the energy assets to determine aggregate energy needs of the energy assets, and using a thermoacoustic power device to generate electricity and heat to the facility according to the monitored temperature, the monitored weather and the monitored energy assets, where the thermoacoustic power device is controlled by the controller.

According to one aspect, the invention is further configured to use an RC load to phase adjust a piston in the thermoacoustic power device.

In another aspect, the invention is further configured to use a feedback capacitor to return phase adjusted power from an alternator of the thermoacoustic power device to a motor of the thermoacoustic power device.

In a further aspect, the invention is further configured to use an electronic component that can include an impedance tuning component, a synthetic capacitor, or a physical capacitor, where the electronic component is configured to adjust voltage phasing and current phasing of the power driving a motor of the thermoacoustic power device, where the tuning capacitor maintains a mechanical resonance on an alternator of the thermoacoustic power device by appropriately phasing an electromechanical response to an acoustic impedance of a pressure and a velocity of an acoustic wave at an alternator interaction point of the acoustic wave.

In yet another aspect, the invention is further configured to use a rectifier and a boost convertor to isolate a voltage of the thermoacoustic power device from a grid connection.

According to one aspect of the invention, the appropriately programmed controller is further configured to modulate output power from the thermoacoustic power device, where the appropriately programmed controller controls electrical properties that can include current, voltage, phase, and frequency, where the appropriately programmed controller adds the electrical property to the thermoacoustic power device and subtracts the electrical property from the thermoacoustic power device to adjust the output power from the thermoacoustic power device.

In another aspect, the invention is further configured to use i) a capacitor, ii) a battery, or iii) a capacitor and a battery that is normally isolated from power lines of the thermoacoustic power device, where the capacitor and the battery are charged while the thermoacoustic power device is operating, where the capacitor and the battery and periodically discharged to provide more current to the thermoacoustic power device.

According to one aspect, the invention is further configured to use a current reducer when the thermoacoustic power device requires a reduced power output.

In yet another aspect, the invention is further configured to use a passive RC control for piston phasing of the thermoacoustic power device to eliminate electric feedback phase delay, where inverter motor power feedback is digitally controlled by the appropriately programmed controller for adjusting a power level and transient operating conditions of the thermoacoustic power device.

According to a further aspect of the invention, a component of the thermoacoustic power device includes a plurality of transducers, where the component can include a motor or an alternator of the thermoacoustic power device.

In another aspect of the invention, the appropriately programmed controller is configured to identify the type of the energy asset using a sensor capable of integrating crowd source information to triangulate an energy asset make and model.

According to one aspect, the invention further includes a tuning capacitor, where the tuning capacitor is configured for use by a motor of the thermoacoustic power device, where the tuning capacitor enhances efficiency of an LRC circuit of the motor, where the tuning capacitor is configured to provide electrical reactive power for tuning mechanical operation of the thermoacoustic power device. Here, in one aspect the motor, the alternator, or the motor and the alternator include elements such as a piezoelectric transducer, a linear reciprocating transducer, a rotary transducer, a magnetostrictive transducer, and a magnetohydrodynamic transducer. In another aspect the motor, the alternator, or the motor and the alternator include a piezoelectric transducer and an inductor, where the piezoelectric transducer and the inductor are configured to electrically tune a piezoelectric resonant frequency. According to another aspect, a tuning capacitor is configured for use by the motor, the alternator, or the motor and the alternator to enhance efficiency of the LRC circuit of the motor, the alternator, or the motor and the alternator, where the tuning capacitor is configured to provide electrical reactive power for tuning mechanical operation of the thermoacoustic power device. In yet another aspect, a tuning capacitor or an inductor is configured to be electronically simulated by phase adjusting a voltage and a current according to a desired phase angle of the thermoacoustic power device.

In another aspect, the invention is further configured to use a power factor correction circuit, where the power factor correction circuit is configured to isolate an alternator of the thermoacoustic power device from a user load by simulating all the user loads as a single resistor, where the power factor correction circuit is configured to isolate power of a motor of the thermoacoustic power device from an alternator of the thermoacoustic power device, where phasing of the motor piston of the thermoacoustic power device is decoupled from the reactive load on the alternator. Here, the invention is further configured to use a tuning capacitor disposed between power from the alternator and the power factor correction circuit, where reactive power is provided to electrically enable mechanical resonance, where tuning the phasing between the alternator and motion of the motor pistons of the thermoacoustic power device is enabled. In another aspect, the invention is further configured to utilize a pulse width modulator to generate an electrical signal for the motor power output and to adjust electrical properties that can include amplitude, phase, and frequency according to user load requirements. In another aspect, the invention is further configured to electronically maintain a constant resistive load on the alternator regardless of upstream power demand. According to another aspect, a component of the thermoacoustic power device includes a plurality of transducers, where the component can include a motor and an alternator of the thermoacoustic power device. In another aspect, the component of the thermoacoustic power device includes an element such as a single piezoelectric, a linear reciprocating transducer, a rotary transducer, a magnetostrictive transducer, and a magnetohydrodynamic transducer. In yet another aspect, the motor, the alternator, or the motor and the alternator include a piezoelectric transducer and an inductor, where the piezoelectric transducer and the inductor are configured to electrically tune a piezoelectric resonant frequency. According to another aspect, the invention further includes a tuning capacitor, where the tuning capacitor is configured for use by the motor to enhance efficiency of an LRC circuit of the motor, where the tuning capacitor is configured to provide electrical reactive power for tuning mechanical operation of the thermoacoustic power device. In another aspect of the invention, a tuning capacitor or an inductor is configured to be electronically simulated by phase adjusting a voltage and a current according to a desired phase angle of the thermoacoustic power device.

According to another aspect, the invention is further configured to use a power factor correction circuit to power a DC bus. In another aspect, operations such as providing power for maintaining motor operation, providing user load power, and powering system peripherals are configured to provide an invertor or pulse width modulation directly through DC power or reinverted to AC power through an appropriate frequency and voltage amplitude required by the user load. In another aspect, the DC bus includes power inserted from power sources that can include a photovoltaic panel, thermoelectrics, a fuel cell, a wind turbine, battery, or a hydroelectric system. In a further aspect the motor, the alternator, or the motor and the alternator include a plurality of transducers. Here, the motor, the alternator, or the motor and the alternator have elements that can include a single piezoelectric, a linear reciprocating transducer, a rotary transducer, a magnetostrictive transducer, or a magnetohydrodynamic transducer. In yet another aspect, the motor, the alternator, or the motor and the alternator include a piezoelectric transducer and an inductor, where the piezoelectric transducer and the inductor are configured to electrically tune a piezoelectric resonant frequency. According to another aspect, the invention further includes a tuning capacitor, where the tuning capacitor is configured for use by the motor to enhance efficiency of an LRC circuit of the motor, where the tuning capacitor is configured to provide electrical reactive power for tuning mechanical operation of the thermoacoustic power device. In yet another aspect, a tuning capacitor or an inductor is configured to be electronically simulated by phase adjusting a voltage and a current according to a desired phase angle of the thermoacoustic power device.

According to one aspect of the invention, power delivery to the energy asset is configured to be self-learning over a time-based period by the appropriately programmed controller, where the self-learning is according to previously a determined signature of the energy asset to improve performance. In one aspect, the self-learning includes monitoring the energy asset to determine analytical information about energy loads from a plurality of power facilities, where the power facilities are aggregated to understand usage locally and globally. Here, the self-learning is configured to predict potential failure modes of the energy assets and configured to take preemptive correction.

DETAILED DESCRIPTION

The energy conscious consumer seeking ways to maximize energy security; minimize heating and electricity costs; reducing a carbon footprint; using a cleaner source of power; and reduce overall fuel consumption is interested in a micro-combined heat and power (μ-CHP) solution, according to the current invention. This approach enables the local production of electricity while utilizing the waste heat productively.

Figure 1A:
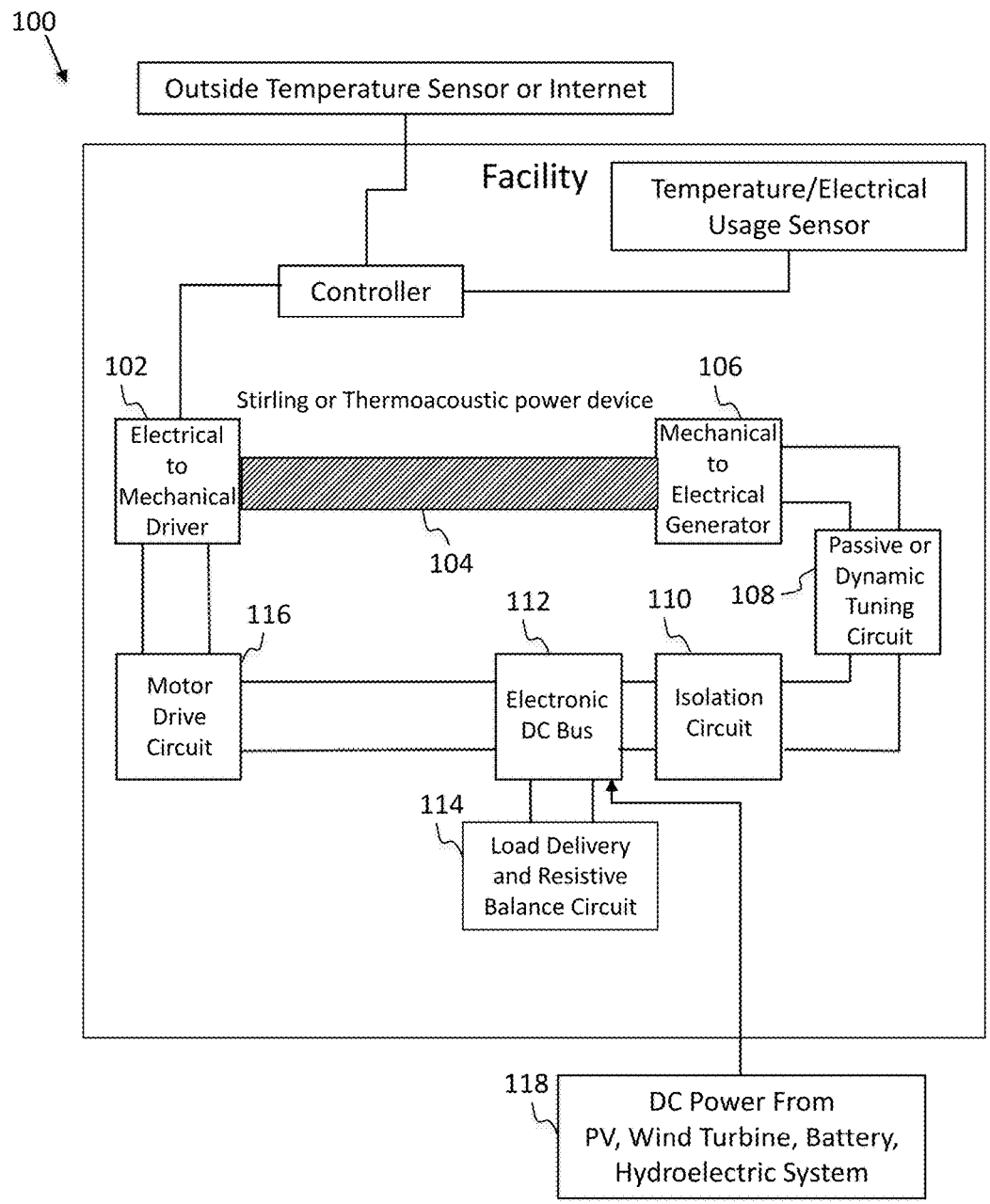
FIGS. 1A-1E show schematic drawings of (1A) the control system, (1B) a power stick, (1C) a schematic drawing of a power stick with heat input, (1D) RC loaded passive feedback control to the thermoacoustic engine, (1E) passive feedback power loop to the thermoacoustic engine, according to embodiments of the current invention.
Figure 1B:
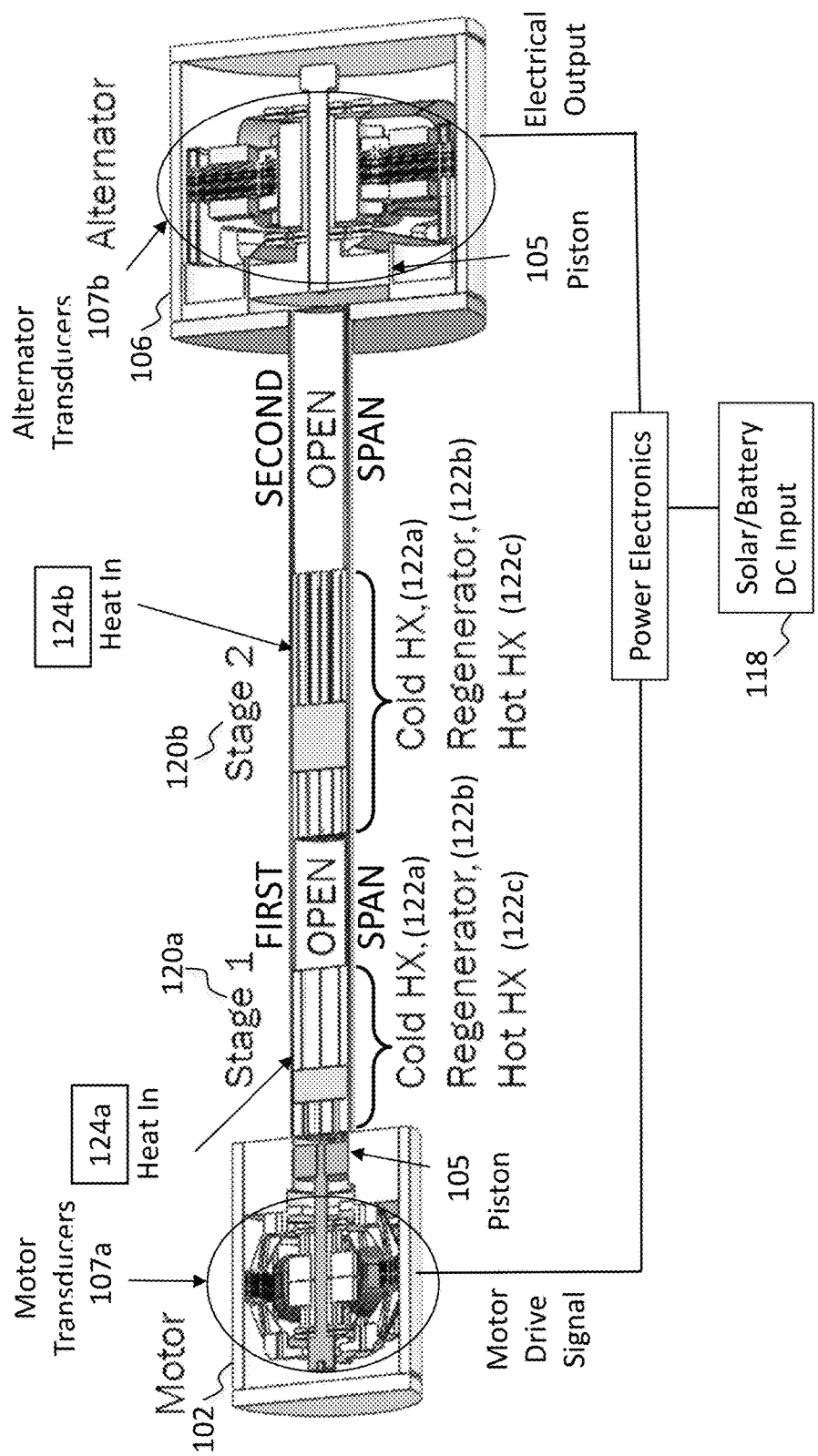
Figure 1C:
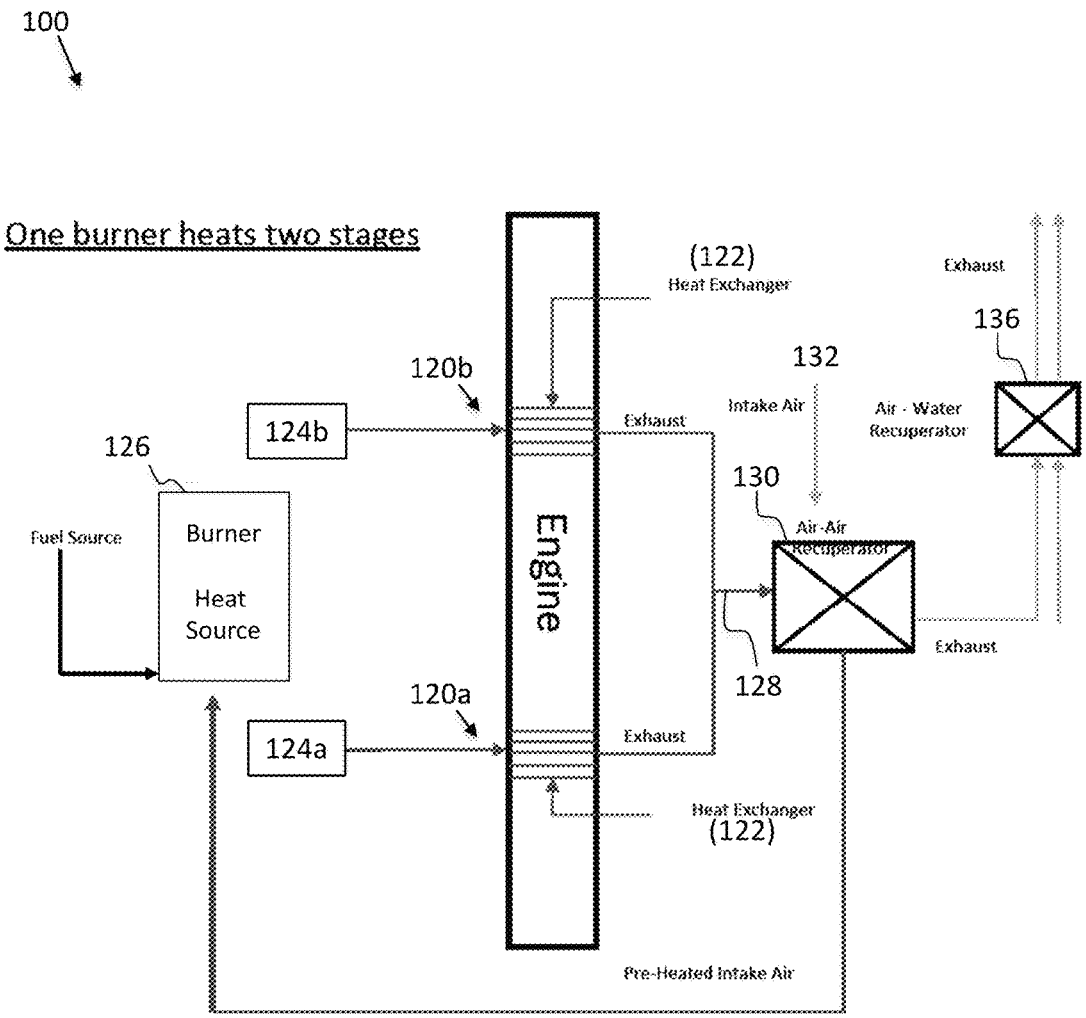
Figure 1D:
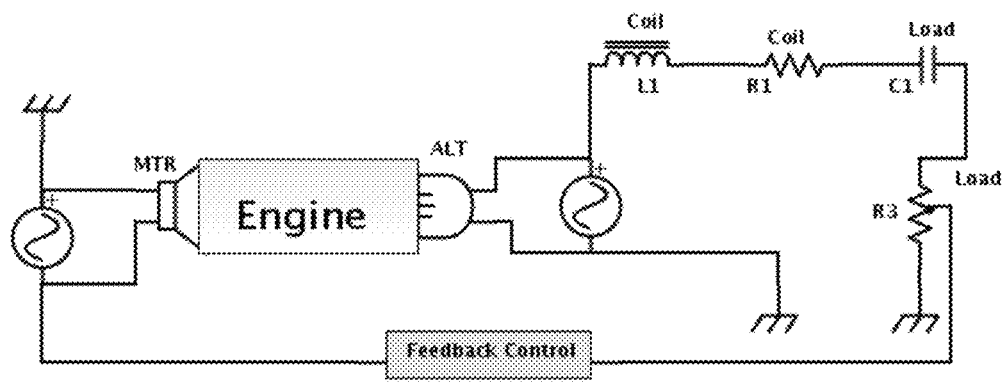
Figure 1E:
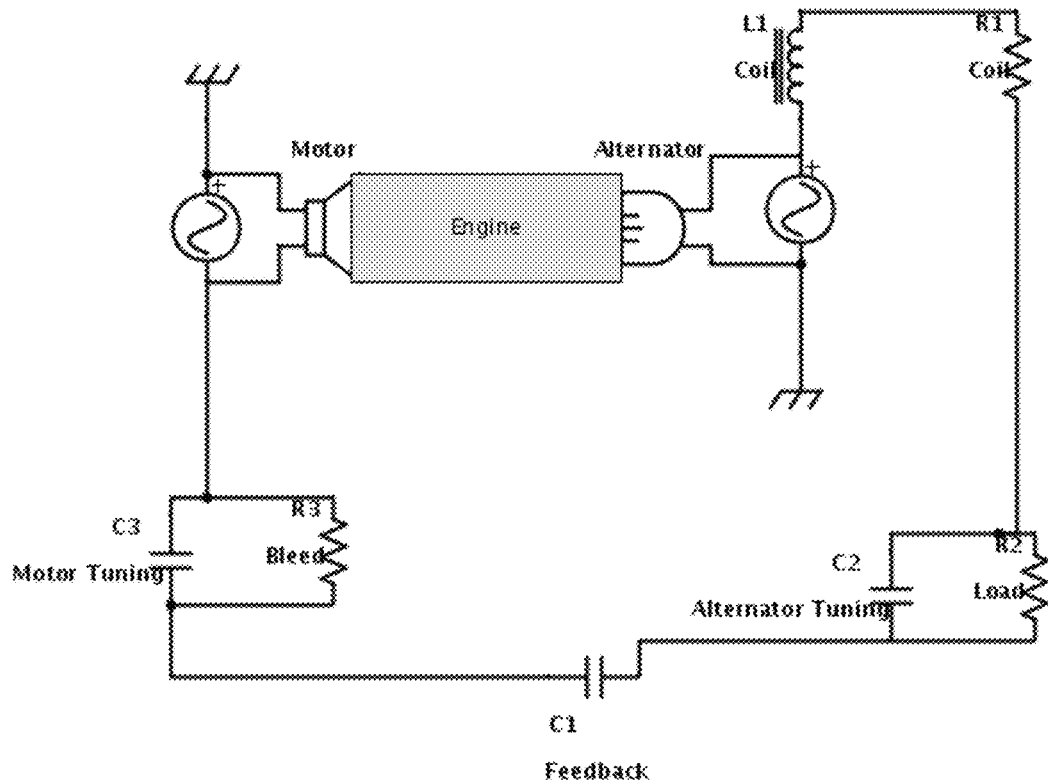
Figure 2:
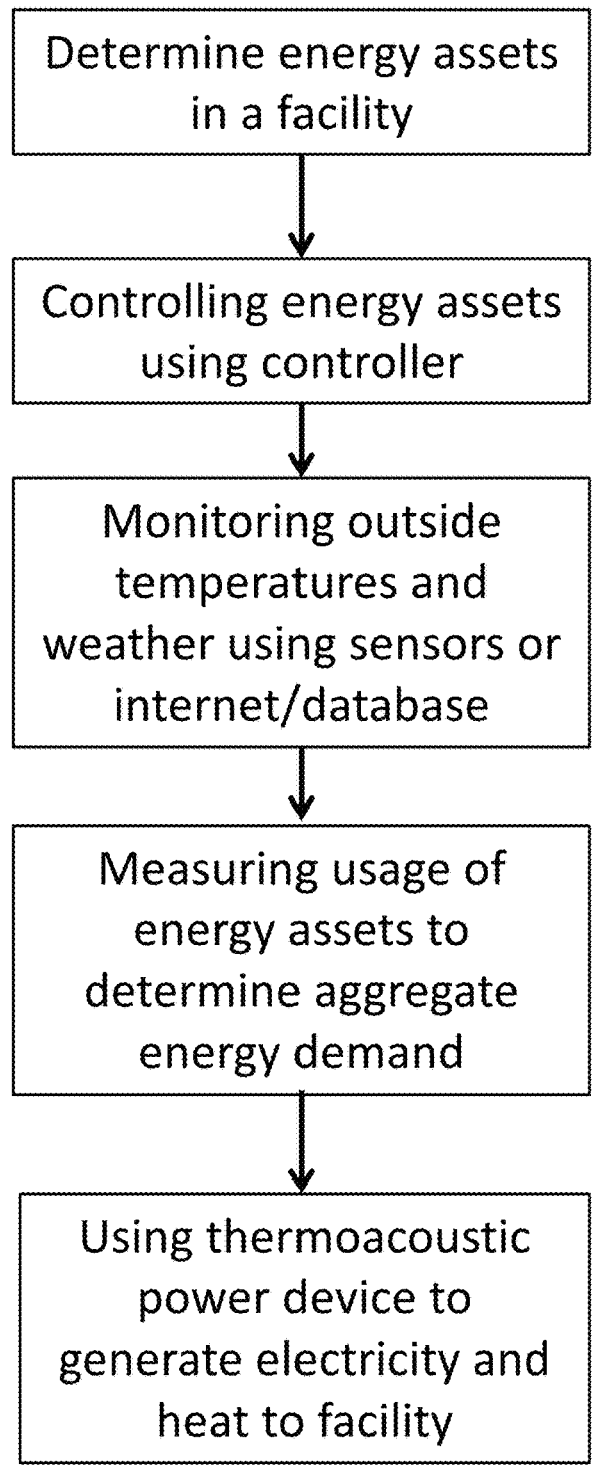
FIG. 2 shows a flow diagram of the method of controlling facility power requirements, according to one embodiment of the invention.

FIGS. 1A-1E show schematic drawings of (1A) the control system, (1B) a power stick, (1C) a schematic drawing of a power stick with heat input, (1D) RC loaded passive feedback control to the thermoacoustic engine, (1E) passive feedback power loop to the thermoacoustic engine, according to embodiments of the current invention, FIG. 2 shows a schematic drawing and a flow diagram of a method of controlling facility power requirements using a thermoacoustic power device, respectively, that includes determining energy assets in a building, where power requirements and a unique electrical signature of the energy assets are identified, where the energy assets can include electrical appliances, heating appliances, and cooling appliances. The method further includes controlling the energy assets using an appropriately programmed controller, where the controller controls the energy assets across a network such as an internet and/or an intranet, where the controller includes a security system protocol, then monitoring outside temperatures and weather using sensors controlled by the controller and receiving weather data via the network, measuring usage of the energy assets using sensors, where the sensors include a temperature sensor or an electrical usage sensor, where the electrical usage sensor measures a load-response signal of an on/off operation of the energy assets, where the load-response signal identifies a specific energy asset by the controller, where the controller monitors energy usage of the energy assets. The controller uses the monitored temperature, the monitored weather and the monitored energy usage of the energy assets to determine aggregate energy needs of the energy assets. A thermoacoustic power device is used to generate electricity and heat to the facility according to the monitored temperature, the monitored weather and the monitored energy assets, where the thermoacoustic power device is controlled by the controller.

One embodiment of the current invention is the μ-CHP technology, which is based on multistage thermo acoustics that can achieve better efficiency than, and maintenance-free operation of a free-piston Stirling, but at a much lower production cost that has no hot moving parts and increased reliability. A combination of traveling and standing acoustic waves is used to achieve high efficiency. This document refers to this system as a thermoacoustic power device, also referred to as a Thermo Acoustic Power Stick (TAPS™). Here, a control system allows remote control of the thermoacoustic power device over a communication network. The control system incorporates inputs, for example, from the users' travel schedule, weather forecast, historic demand information, building thermal performance, electricity usage of appliances, furnaces and other home or business devices, appliances or systems. The control system is capable of optimizing the usage of thermoacoustic power device by determining the optimum usage of the energy assets in the building, including the ability to generate electricity, heating and cooling as described in an accompanying application. The system is capable of learning heating and cooling demands and can incorporate this information over time while improving energy efficiency and comfort for building inhabitants. The control system can be employed via a variety of ways, such as applications for a mobile device such as a cell phone, iPad, or other similar devices, an appropriately programmed controller, a computer or an electronic appliance capable of running an application. The application may obtain information via a common communication network such as the internet, and extranet or an intranet. Security is of key concern and is addressed via technology related to the specific characteristics of the mobile device or storage component in the device to reduce the probability of a security breach that might affect connected thermoacoustic power device to the communication system, while still enabling meaningful control over a public network. (Note: using device specific root of trust modules keeps keys safe, but narrowing the number of allowed connections to the TAPS and routing all other devices via proxy minimizes risk of breach. E.g. only primary user controller and cloud server allowed to connect—secondary devices must go through cloud server). Special sensors are part of the thermoacoustic power device building network enabling direct measurement of energy usage of appliances. These sensor data can be used by the optimization and control system to improve energy usage. Sensors might include temperature sensors, sensors for measuring the electricity consumption of energy assets such as refrigerators, heaters, TVs, computers, kitchen appliances, power tools, and other devices and system used in and around the home, building or commercial facility.

While other µ-CHP systems require fixed electronic loads or complex control systems, the inherent stability of the thermoacoustic power device, according to one embodiment of the invention, enables operation at varying loads and power levels while maintaining efficiency, with a simple burner system.

According to one embodiment, FIG. 1A shows the basic operation of the thermoacoustic power device is based on an alpha Stirling Thermoacoustically Resonated Electro-Acoustically Modulated (alpha-STREAM) engine. According to one embodiment, the thermoacoustic power device operation includes:
 Creating a small acoustic wave.
 Using heat to amplify an acoustic wave.
 Resonating that wave to further amplify it.
 Using a second stage to amplify the wave further.
 Using the mechanical energy from the amplified wave to produce electricity.
 Feeding back some of the energy to the input to make a new acoustic wave and sustain system power.
 Using excess generated power for user load.
 Repeating the above processes.

This is the first time a cascaded regenerator thermoacoustic device has used electronic feedback to create an engine that is ideal for use in a µ-CHP application.

Turning now to an exemplary embodiment, the power device is oriented vertically to minimize piston side loads, thermal buffer tube losses, and footprint, but it can be operated in other orientations as well, such as horizontal. The multistage embodiment keeps the engine diameter small enough to fit within a kitchen cabinet even as the power increases. The multiple heat exchanger sections along the tube allow for more heat to enter the engine with a single burner.

The usage of thermoacoustic power device is dependent on a number of different parameters, such as the demand for electricity, heat and cooling as a function of time. Demand varies by hour, day, and throughout the year, and may depend on geography, requiring control and optimization of the usage of the thermoacoustic power device. This invention provides a method that is particularly suitable for thermoacoustic power device as the amount of electricity, heat and cooling can be varied within bounds in an almost independent manner by varying the feedback loop parameters as a function of demand for heat, cooling and electricity. Heat and cooling needs can be measured using a thermostat, for example, or it can be predicted by knowing the parameters that determine the amount of heat and cooling required. These include, for example, the outside and desired inside temperatures, the heat load, the cooling load, thermal characteristics of the building, and other environmental parameters such as humidity, altitude and related parameters.

FIGS. 3A-3L show schematic drawings of different electronic configurations of the Stirling or thermoacoustic power device, according to embodiments of the invention. Most electricity meters measure aggregated electricity usage. The current invention includes a method and implementation for directly measuring the electricity usage of energy assets in the network where a thermoacoustic power device is connected. For example, this can be a home where, for the user loads there are for example a TV, a washing machine, a dryer, refrigerator, computers, lamps, a microwave, oven, coffee maker, hot water kettle, and other electrically driven devices and appliances such as power tools, saws, and electric cars. According to one aspect, the invention is further configured to use the electronics to tune and modulate the power and heat production of the thermoacoustic power device. The invention is further configured to use a feedback capacitor to return phase-adjusted power from an alternator of the thermoacoustic power device to a motor of the thermoacoustic power device. In a further aspect, the invention is configured to use an electronic component that can include an impedance tuning component, a synthetic capacitor, or a physical capacitor, where the electronic component is configured to adjust voltage phasing and current phasing of the power driving a motor of the thermoacoustic power device, where the tuning capacitor maintains a mechanical resonance on an alternator of the thermoacoustic power device by appropriately phasing an electromechanical response to an acoustic impedance of a pressure and a velocity of an acoustic wave at an alternator interaction point of the acoustic wave.

In yet another aspect, the invention is further configured to use a rectifier and a boost convertor to isolate a voltage of the thermoacoustic power device from a grid connection.

According to one aspect of the invention, the appropriately programmed controller is further configured to modulate output power from the thermoacoustic power device. The controller controls electrical properties that can include current, voltage, phase, and frequency, where the controller adds the electrical property to the thermoacoustic power device and subtracts the electrical property from the thermoacoustic power device to adjust the output power from the thermoacoustic power device.

In another aspect, the invention is further configured to use a capacitor and/or a battery that is normally isolated from power lines of the thermoacoustic power device, where the capacitor and the battery are charged while the thermoacoustic power device is operating; the capacitor and the battery and periodically discharged to provide more current to the thermoacoustic power device.

According to one aspect, the invention is further configured to use a current reducer when the thermoacoustic power device requires a reduced power output.

In yet another aspect, the invention is further configured to use a passive RC control for piston phasing of the thermoacoustic power device to eliminate electric feedback phase delay, where inverter motor power feedback is digitally controlled by the appropriately programmed controller for adjusting a power level and transient operating conditions of the thermoacoustic power device.

According to a further aspect of the invention, a component of the thermoacoustic power device includes a plurality of transducers, where the component can include a motor and/or an alternator of the thermoacoustic power device.

According to one aspect, the invention further includes a tuning capacitor, where the tuning capacitor is configured for use by the motor of the thermoacoustic power device, where the tuning capacitor enhances efficiency of an LRC circuit of the motor, where the tuning capacitor is configured to provide electrical reactive power for tuning mechanical operation of the thermoacoustic power device. Here, the motor and/or the alternator include elements such as a piezoelectric transducer, a linear reciprocating transducer, a rotary transducer, a magnetostrictive transducer, and a magnetohydrodynamic transducer.

In another aspect the motor, the alternator, or the motor and the alternator include a piezoelectric transducer and an inductor, where the piezoelectric transducer and the inductor are configured to electrically tune a piezoelectric resonant frequency. According to another aspect, a tuning capacitor is configured for use by the motor, the alternator, or the motor and the alternator to enhance efficiency of the LRC circuit of the motor, the alternator, or the motor and the alternator, where the tuning capacitor is configured to provide electrical reactive power for tuning mechanical operation of the thermoacoustic power device. In yet another aspect, a tuning capacitor or an inductor is configured to be electronically simulated by phase adjusting a voltage and a current according to a desired phase angle of the thermoacoustic power device.

Figure 4A:
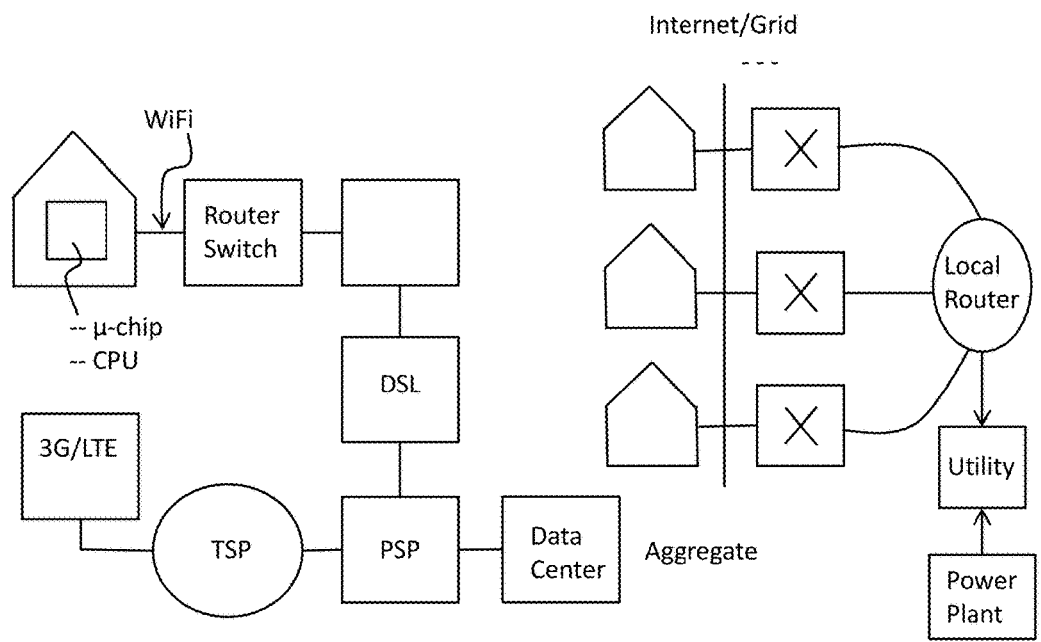
FIGS. 4A-4B show diagrams of the Stirling or thermoacoustic power device integrated to power facilities, according to one embodiment of the invention.
Figure 4B:
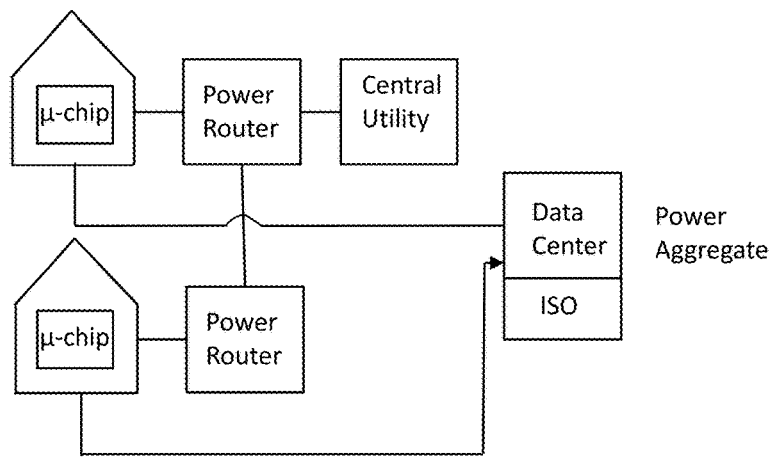

FIGS. 4A-4B show other aspects of the invention, where the appropriately programmed controller is configured to identify the type of the energy asset using a sensor capable of integrating crowd source information to triangulate an energy asset make and model. It is important to understand precisely when these devices are being used and how much energy they utilize over time. Therefore present invention provides measurement of the individual energy consumption over time, and uses this information as input to an energy management system that controls the operation of the various connected devices in the building or connected to the power network including the thermoacoustic power device. According to one embodiment, the invention utilizes a sensor capable of measuring the response of an appliance or device when it is turned on or off. During power up or down, the appliance or device produces a response to the input or shutdown of an electrical Heaviside function (which may exhibit characteristic ringing voltage or current fluctuations). The resistive and reactive elements of the load produce a characteristic response signal when, for example, a washing machine is turned on and 120V is applied to the device. By measuring the electric impulse response characteristics of the various home devices, the control algorithm can determine what apparatus is turned on or off, and monitor the energy usage. In this manner a control program can determine the overall aggregate energy needs as well as the energy usage of individual devices and appliances. Here, a specific make/model can be determined to be running within ideal operating conditions by comparing the loads with other similar make and models that have been crowd sourced.

In one embodiment, the control program incorporates this information and learns over time to predict the energy usage in the thermoacoustic power device connected network in aggregate as well as for each individual device and appliance. The self learning algorithm can take into account additional information such as weather information, travel schedules and work schedules from building participants by gleaning information from calendars such as Microsoft Outlook, or Mac Calendar, or similar programs. According to one aspect of the invention, power delivery to the energy asset is configured to be self-learning over a time-based period by the appropriately programmed controller, where the self-learning is according to previously a determined signature of the energy asset to improve performance. In one aspect, the self-learning includes monitoring the energy asset to determine analytical information about energy loads from a plurality of power facilities, where the power facilities are aggregated to understand usage locally and globally. Here, the self-learning is configured to predict potential failure modes of the energy assets and configured to take preemptive correction.

For an example of the self-learning, when a family is on vacation, the control program and system can determine the environmental conditions desired in the building, for example by lowering the temperature in the home or building. The control system can also determine that electricity can be sold back to the electricity grid based on market prices for electricity and fuel such as gas and oil. Over time the control program optimizes the use of the energy assets, including for example the amount of electricity to generate, the amount of heat and cooling, when to charge the electric car, run the dishwasher, and when to discharge heat from a storage tank, or when to store heat. In solar or battery assisted thermoacoustic power device as described in a companying application, the control program may optimize the use of gas for energy generation depending on solar presence. The individual thermoacoustic power devices are connected to a wide area network and a central data base system so that inputs from multiple thermoacoustic power devices can be aggregated for further optimization of an individual thermoacoustic power device operating conditions as well as optimization of a collection of thermoacoustic power device.

As an example, 125,000 4 kW thermoacoustic power device constitutes a 500 MW power plant. A utility or operator would be able to optimize utilization of the energy assets in a learning manner so that the control programs for the individual thermoacoustic power device optimizes energy use, and this can be achieved under constraints of energy optimization of collections of thermoacoustic power device. The program automatically learns from past experience and current sensor and information inputs to continue optimization of the overall energy system and network.

Consumers and businesses get access in real time to the performance of the thermoacoustic power device in a dashboard fashion on mobile devices, such mobile phones, iPads, tablet computers, computers, and other devices capable of running control and optimization programs. Optimization might occur locally at the thermoacoustic power device level or globally at the data center level where information from multiple thermoacoustic power devices are utilized.

According to one embodiment, the current invention provides a system for securely controlling energy usage in a building or facility using a learning algorithm that automatically optimizes energy usage over time in a secure manner using a combined heating and power generation system. In one aspect, the invention includes a combined heating, cooling and power generation system. In another aspect, the invention includes aggregating and controlling multiple μ-CHPs into a distributed power plant. The thermoacoustic power devices connected to a public communication network are potentially vulnerable to security breaches. Security breaches are well documented in public and private communications. A security breach in the thermoacoustic power device control program could potentially have significant impact as energy system could be controlled by a rogue entity. The current invention incorporates a security system based on utilizing a secure function in controllers utilized to control devices such as processors and storage systems. These devices incorporate controllers that contain two partitions. One secure area with restricted access and one where user programs can run. The secure area of the processors is encrypted and operation is very restricted. The banking industry has developed, for example secure transaction protocols and operating systems that have been implemented by ARM for enabling secure banking transactions. The present invention improves on this approach by using control processors and secure communication systems that can be revoked by a central authority on an individual thermoacoustic power device basis, and no single encryption key is used anywhere in the secure communication and control system for thermoacoustic power device. This is unlike the DVD and CD secure implementations, where the same key is used for all movies and content stored on each of these devices. The thermoacoustic power device control system is therefore secure, allows revocation of any thermoacoustic power device that has been compromised, and does not allow for mass decryption of a class of thermoacoustic power devices. A central security authority controls updates to the control programs on an individual thermoacoustic power device basis.

Turning now to an embodiment comprising a low cost ceramic molded multistage thermoacoustic heat engine for high efficiency, the thermoacoustic power device technology is the first combined heat/power device based on multistage thermoacoustic technology with electronic feedback. The current invention provides a device and method of manufacture of a new type of high temperature regenerator, engine tube, heat exchanger and balance of plant that enables high efficiency and reliability of the heat engine. With the optimization of these components, a heat engine may be smaller, more efficient, less expensive, and simpler to make than current state-of-the-art.

The "system," comprised of both the thermoacoustic power device component and the combustion assembly architecture (burner, heat exchanger fins, recuperator; hereafter referred to as the "combustion system") are made from materials including 1) all metals and metal alloys, 2) all ceramic materials, or 3) an integration/combination of ceramic-base and metals-base materials. Ceramic-metallic (CerMet) materials are also candidates. Polymers and pre-ceramic polymers may also be considered/included and could play important roles in areas such as insulation. Composite materials are another important class that are likely to be utilized where the composite may have either a metallic or a ceramic matrix and reinforcing media that may be metallic, intermetallic, or ceramic. Such reinforcement may be included in forms of metallurgical phases in a materials system, dispersion strengthening that may have an aspect ratio between 1 and 10, or fibers that are continuous and embedded into the metal or ceramic matrix. Mechanically alloyed materials are also strong candidates for thermoacoustic power device component or burner system application as anisotropic performance of materials is sometimes favored. Materials and materials systems are selected based on attributes such as mechanical response (tension/compression, creep, fatigue, torsion) and physical properties (e.g., density, thermal conductivity, thermal expansion, and heat capacity), fabrication techniques, and cost. Modeling of expected system stresses helps to define materials selection. Integration of one or more materials into any single component is possible to benefit from combinations of materials properties to meet a component's physical and mechanical characteristic requirements. Coatings may be employed to improve performance in the thermoacoustic power device and/or combustion system as well. Such coatings may be chosen for any of the following reasons/requirements: environmental protection/durability, control of the hardness of a component surface, lubricious control; essentially control of wear, heat, friction, and corrosion. Thermal spraying and plasma spraying are candidates for surface control as well.

Some details as to potential processes selected for fabricating and assembling the thermoacoustic power device and combustion system is included here as performance of every aspect of the thermoacoustic power device or combustion system is related both to materials selected and processing. Processing selection is a key element for component, and therefore, system performance. Processes for making, fabricating, and assembling also contribute strongly to the performance of the thermoacoustic power device and combustion system. The performance of all materials is related to its microstructure and the microstructure is controlled through alloying, forming processes, and all conceived post-forming processes that create a material's microstructure that results in desired material performance. Processes related to such material property manipulation/selection include casting (sand, shell, spin, permanent mold, die, investment, ablation, centrifugal), swaging, extrusion, stamping, drawing, rolling, forging, powder metallurgy, heat treatment. Individual parts/components are formed through a single event or combination of the following events: cutting (sawing, shearing, torch, water jet, laser), milling, lathe processing, mold techniques are particularly useful. Molding techniques include powder metallurgy plus sintering, compression molding, extrusion molding, and injection molding. Since versatility in fabrication and manufacture of components is also essential, emerging technologies such as additive manufacturing will become a key manufacturing process. Additive manufacturing systems such as direct micro laser sintering (DMLS), binder jet processing, SLA printing, SLS printing. Such "net shape" technologies contribute to cost effectiveness and reduce waste.

Joining techniques are also of critical importance as behavior at joints and interfaces in the thermoacoustic power device or combustion system contribute to performance/efficiency while also mitigating risks of failure. Interfaces of metal/metal, metal/ceramic, ceramic/ceramic or a combination of any aforementioned materials is critical. Control of the microstructure, and therefore performance, in interface areas is critical so the choice of joining technique and post-joining procedures is key. Joining techniques include fusion welding (gas metal arc welding, gas tungsten welding, electron beam welding, resistance (spot, seam, projection, flash, and upset welding) and brazing (furnace (inert gas, vacuum, or air), torch, and in-situ). Solid state processes are in most cases preferred when possible. These processes may or likely include diffusion bonding, and localized forging processes like inertia welding, forge welding, and friction stir welding, hot press welding, hot isostatic pressure welding, electromagnetic pulse welding, ultrasonic welding. Mechanical attachment such as bolting, riveting, and clamping will also be utilized. Including such a wide list of joint bonding/binding techniques is as important as selecting/listing potential materials themselves. As µ-CHP systems continue to be applied into emerging markets with an array of unique requirements, a variety of fabrication and forming techniques will be necessary to meet specific performance metrics.

Similarly, ceramic material fabrication and performance is greatly dependent on method of manufacture. Techniques that would be common to ceramic component manufacture for thermoacoustic power device and combustion system include slip casting, injection molding, conventional molding, pressing, and sintering. Advanced additive manufacturing techniques are also maturing where net shape parts will be processed.

Joining techniques are specialized and many times involve metallizing of a ceramic surface or bonding using a ceramic suspension compound.

Anticipated operating temperatures are up to 1500° C., or possibly more, for the ceramic materials, which would support a 50% efficient heat engine, converting heat into electricity. Complex modeling using accurate 1D, 2D, and 3D techniques confirm the anticipated performance of the hotter operating engine.

Referring now to the invention in more detail, the basic linear topology of the thermoacoustic power device engine enables forming the engine into a tube. The engine portion of the power system is where thermoacoustic magnification of energy takes place. This linear tube geometry reduces stress, cost, and enables simple casting into a ceramic platform. The ceramic platform also includes plumbing for delivering hot air and cold water to areas surrounding the heat exchangers to help govern control of the temperature ratio across the regenerator. An alternative to a power system comprised of mostly metallic elements, an alternative, "mostly ceramic," power system is able to withstand higher heat and can be tailored in specific areas of the ceramic platform to embody the correct balance of physical characteristics that maximizes performance and efficiency. Instead of using metal components, a single molded ceramic engine is used to contain not only the engine, but the balance of plant components. The balance of plant components may either made out of the same ceramic materials as the mold, in an integrated manner, or can be of a different composition, optimized for the particular function they perform. For example, fins in the shape of channels around the hot heat exchanger can be optimized in shape and composition for the purpose of conducting heat to the hot heat exchanger. The recuperator may be produced through the use of high temperature ceramics that efficiently conduct heat in a counter propagating flow configuration. Such conductive ceramic materials belong to a particular class called "ultra-high temperature ceramics (UHTCs)." The balance of plant components may be integral to the main engine molded or 3-D printed engine, or connected to it through appropriate interfaces capable of handling high temperatures, such as ceramic gaskets. The integrated ceramic engine has considerable benefits, besides the ability to increase the operating temperature of the engine, thereby increasing the efficiency of operation. These benefits, due to the ceramic engine platform being a molded, formed, and integrated "singular" component, result in an attractive design profile where parts do not need to be fastened to each other as in conventional metallic-base systems where bolts and other well-known fastening techniques are necessary. At high temperatures over 1500° C., several dependable mechanical fastening options that include the use of ceramic bolts, nuts and other typical mechanical fastener components are/can be utilized. These fasteners are subjected to significant stresses and mechanical forces due to temperature and other classical stress profiles associated with specific fastener elements and the fastened joints themselves. In all such cases, it is important to select appropriate ceramic materials that possess qualities such as adequate fracture toughness, strength, conductivity and thermal shock characteristics. As mentioned earlier, advanced manufacturing techniques are maturing such that the ability to additive printing ceramic materials using a variety of ceramic materials candidates is possible. Printers exist that are capable of creating intricate and complex shapes through a layer-by-layer printing process, making it possible to manufacture complex systems with internal shapes and elements that are difficult to mold with conventional techniques. Such "net shape" processing contributes to both cost savings and performance reliability. One such example for candidate ceramic additive manufacturing is the burner system that is subject to an accompanying patent application.

One of the most important components in the engine is the regenerator since that is the location where the acoustic wave is amplified. In the case of fiber regenerators; fibers or fiber networks may be cut and assembled and oriented randomly. The random oriented fibers are then compressed into a desired volume, ensuring the appropriate porosity by weight, and sintered together. The regenerators may be compressed into their final volume individually or by utilizing a concept more tailored for mass production. The mass production concept utilizes the same process as that for an individual regenerator except that a series of regenerators are processed at the same time in a single ceramic tube whose inner diameter is close to that of the desired outer diameter of the regenerator. The sintering process must be conducted within a controlled environment furnace to ensure that oxidation is of the random fiber compacts are controlled, and may even preferentially oxidize the fibers to attain preferred characteristics "protective oxide" characteristics. Fiber materials including stainless steel, iron-chromium-aluminum alloys, alpha and beta silicon carbide, carbon fiber, aramid, glass, and other high temperature ceramics may be utilized for their properties within certain operating regimes. Typical configurations of the regenerator include discs and annular rings, though conical and other geometries may be utilized.

In order to optimize the regenerator performance, fiber diameter and porosity are chosen to best match thermal and viscous penetration depths. These factors are dependent on temperature, frequency, pressure, and working fluid. While typical state of the art seeks to identify a single porosity, fiber diameter, and length for each regenerator, the current invention allows for the regenerator to be stratified or continuously varied in porosity, fiber diameter, and composition of fibers. This is achieved through individually compressing and sintering layers of regenerator material. One such use of this method pertains to operation over 850° C., at which point metallic fibers began to become more susceptible to oxidation and long term degradation. The current invention allows for ceramic fiber components to be used instead or in conjunction with metallic random fiber compacts. This includes fibers (e.g., $\alpha$-SiC, $\beta$-SiC, UHTCs) to be utilized within the portions of the regenerator in which the temperature exceeds metallic temperature capabilities, while still utilizing metallic fibers in the sections of regenerator wherein the properties of these fibers may still be more beneficial.

Some designs have also shown that stacks of honeycomb, or gridded architecture, as well as lenticular arrays may be utilized, though until recently these methods were not practical because the availability of these products were limited to few vendors and in limited geometries. The current invention identifies three-dimensional printing of ceramics and metallic materials as a method through which to create these components in a cost effective way.

Referring now to this embodiment of the invention in more detail, in the case of fiber regenerators. Fibers utilized for a fiber architecture regenerator may by continuous or segmented. If segmented, they can be of equal lengths or varying lengths. Individual strands of fiber or pre-fabricated networks of fibers can be utilized. Pre-fabricated networks can be in the form of mats, felts, weaves or papers or other yet unknown forms that hold networks of fibers together.

Dimensions of pre-fabricated fiber networks can be thin, made up of only a single layer of fibers or thicker where the fibers comprise more of a 3D array. The orientation of the fibers can be aligned or random; can stay within the same plane or vary randomly in a 3D space. The length of the fibers can range from small (whisker size) to continuous, and the diameter chosen can be on the order of less than a micron to hundreds of microns in diameter. Networks of fibers can be a singular diameter or comprise a range of diameters. Networks of fibers can be made from a range of lengths of fiber as well. It is expected that fibers will have many contact points with each other in such architecture. Fibers can be included from many families of materials including metals and ceramics. Fiber materials can be the same throughout the fiber regenerator or can be a combination of materials. Fibers comprised of different metals can be included adjacent to each other or fibers of different material types can be included adjacent to each other. When different materials are included, the number can range from two to a number that would function as a practical limit. If different materials or types of fiber are included adjacent to each other the volume fraction of each constituent can range from "minimally included" to "maximally included." This volume fraction of each fiber constituent can stay the same throughout the regenerator compact, can vary due to design, or can vary randomly. In addition to the aforementioned random fiber architecture that can be described as similar throughout, a "stratified" architecture could also be chosen or exist. In a "stratified" concept, multiple layers of random fibers with different characteristics can be chosen. With a "stratified" concept, each layer can be completely unique from other strata layers with respect to all aforementioned variables (e.g., fiber material, fiber diameter, fiber orientation, fiber length, etc). Different strata in the same regenerator can be chosen for many different reasons. Examples, however, can help to understand why such a concept may be chosen. For example, multiple strata (e.g., 2) can be chosen because one fiber has a higher temperature capability than another. Another example could be because one fiber may have a different thermal conductivity than another fiber. Such differences in strata characteristics can be discrete between actual layers or can be gradual over the length, width or thickness of the regenerator. A "stratified" regenerator concept is useful when different properties of fibers at varying points along the regenerator can be beneficial due to physical or mechanical or other types of characteristics. A stratified regenerator can also be defined as one where a physical characteristic changes and has nothing to do with different material types. For example, a "stratified" regenerator can vary porosity along any dimension of choice.

Sintering is a temperature, time and pressure process that, in the context of regenerator fabrication, causes fiber contact points to permanently bond together through local diffusion at such contact points. This local diffusion at places of intimate contact between individual fibers is strong enough to keep all fibers locked into contact with each other. This will hereafter be referred to as a sintered compact. A sintered compact is accomplished when a fiber design is pressed into a desired volume and exposed to higher temperatures for sufficiently long periods of time. The temperature should be chosen such that it is high enough to promote diffusion between wires but not so high as to melt the fibers or cause any change in the characteristics, properties or performance of the fibers themselves. The time chosen for the sintering process should be just long enough to promote the necessary aforementioned diffusion and lock the random fiber network into a desired volume with desired characteristics. The container in which the sintering occurs should be chosen so as to not react with the fibers themselves. Also, the sintered compact should not become bonded to the container or contaminated by the container in any way. The container needs to have some type of a fastening system defined where the fiber design is mechanically confined to the volume of the container. This is many times accomplished with bolt/nut assemblies but other ideas such as clasps, clamps and other designs resulting in a compressive mechanical advantage could be used. Once the fiber design is confined to the pre-defined volume, a temperature/time procedure then "locks" it into place. It is also important to note that the material comprising the container should be able to withstand the sintering temperature and should not react with the fiber materials themselves during sintering. This requirement typically suggests that a ceramic material is chosen for containment and fasteners as such a choice limits contamination of the sintered fiber compact due to diffusion of and contamination by metallic elements.

In the context of application into a thermoacoustic power device engine using a Stirling cycle, it is also important to select materials for the regenerator that are resistant to environmental degradation (e.g., oxidation). As oxygen comes into contact with surfaces of the fibers at high temperature an oxidation reaction can occur that changes the character of the fibers. Such an oxidation product can become particularly detrimental to engine performance as spallation is possible and subsequent introduction of particulate into tight tolerance areas and into mechanisms that are supposed to run smoothly can result in loss of machine effectiveness. Therefore, oxidation during both fabrication as well as normal operation is to be avoided. Ironically, a controlled pre-introduction of an adherent, protective oxide layer to the fibers can effectively mitigate or eliminate continued deleterious oxidation reaction, even in the presence of source oxygen at high temperature. Such formation of a "protective" oxide will be different for every unique fiber material that is considered and typically, experimentation is necessary to identify a process that results in an effective and protective layer on the fiber surfaces.

Next, the mass of fiber corresponding to the desired porosity needs to be placed into the container and secured with fasteners. Cutting or some type of shaping is typical at this point to get the desired amount of fiber to best fully fill the desired volume. Such cutting, and sometimes the as-received condition of the random fiber, produces loose fiber material. Therefore, "tamping" or gently shaking loose "crumb-like" fibers from the starting material prior to installation in the ceramic container is necessary. Also, such "particulate" is not effectively sintered in the process, which increases the potential for loose fiber particulate to find its way into a working engine system. It is not uncommon to need a mechanical device like a hydraulic machine to compress the stack of fiber into the desired volume. Typically, much force is necessary. Once the hydraulic press has compressed the fibers into the containment fixture and the ceramic bolt/nut assemblies have been affixed, the hydraulic pressure is removed and the containment fixture stands alone. The pressure that exists between fibers in the compact is helpful in creating a well-sintered product.

Finally, once the sintering process is complete a machining step is many times necessary to size the regenerator perfectly into the engine tube. The "fit" needs to be such that there is no streaming of the working fluid around the edges of the regenerator—all of the working fluid must translate through the random fiber architecture itself. Such a machining step again introduces the possibility of small shards of fiber that need to be removed. This is effectively done through ultrasonic cleaning in ethyl alcohol for about 1 hour. Repeat this ultrasonic cleaning with a new ethyl alcohol bath until no particulate is seen in the bottom of the beaker after the 1 hour duration. A final convection oven step at between 200° F. and 300° F. for 2 to 4 hours dries the regenerator compact and it is now ready for use.

In one embodiment of the invention, ceramic fiber random fiber type regenerators are included—α-SiC, β-SiC, Si3N4. In another embodiment of the invention, the regenerator can include plane parallel plates out of aforementioned ceramic materials or combinations of metals and ceramics for optimized heat transfer properties. Combinations of various geometries of regenerators such as flat plates, holes, fiber structures and other high surface area geometries such as nano fractal patterns may be used by themselves or in combination to optimize heat transfer to the working gas, thereby increasing power output and efficiency. In particular, engineered materials having anisotropic heat transfer characteristics such heat transfer to the gas is optimized in the radial direction but not in the longitudinal direction might have benefits to the operation of the thermoacoustic power device. 3-D printing techniques are particularly suitable for implementing such designs as the 3-D structures are assembled layer by layer.

Last, 3D printing now allows the practitioner to use the best material for the application as long as it is available in fiber form. Previously, Cordierite was the only material available as a ceramic honeycomb product. Now, α-SiC and Ultra High Temperature Ceramics (UHTC) are also possible. These latter materials are more attractive due to their higher thermal conductivities to higher temperatures. Lens-like openings, as opposed to hexagons, in the honeycomb-type structure are also included The ceramic engine tube may be printed or molded to include heat exchangers. Normally, copper heat exchangers are limited to about 1000° C. in operational temperature. However, natural gas can achieve adiabatic flame temperatures as high as 1900° C. and it is desirable to utilize high temperatures to maximize engine efficiency. A ceramic heat exchanger can also be printed or molded using a similar process as the regenerator and engine tube. If the regenerator, engine tube, and heat exchangers are made of ceramic then the entire engine can operate at very high temperatures. Moreover, if the single molded ceramic engine includes the plumbing, burner, and cooling system then very high temperature and low cost fabrication is possible.

An all Silicon-Carbide engine is possible in which the regenerator uses SiC random fibers, the heat exchangers are 3D printed with Si and C binder jet and reaction bonded, the engine tube is made from extruded SiC or molded to include the balance of plant components. This all-ceramic engine would enable efficiencies over 50% and perfectly complements nozzle-mixed burners operating in the invisible flame temperature range. And high volume manufacturing would be accomplished with simple casting resulting in a very low cost product.

Additionally, judiciously chosen cavities and by removing ceramic material where mechanical properties and stress requirements permit, weight can be reduced. Ceramic material is often quite heavy when used in solid casts. Current 3-D printing technology allows designs to be made with internal cavities that reduce weight while maintaining desirable thermal and mechanical properties, which would be very difficult, if not impossible with conventional casting techniques.

Turning now to an embodiment comprising a burner system and a heat delivery system. The current invention enables the use of a single burner to provide power, heating, and cooling in a single appliance.

According to one embodiment, the present invention is a burner system that produces convective heat for a facility power system and produces waste heat for domestic purposes. In contrast to conventional pre-mix and catalytic burner systems in use today, the invention has a nozzle-mixed burner system that achieves higher efficiency, longer life, and requires less maintenance. It is also the first μ-CHP burner system capable of utilizing the higher heating value of fuel while also maintaining very high heating efficiency and very low emissions. The burner system is the first to operate in the invisible flame range while still maintaining full controllability. The burner system convectively heats the thermoacoustic power device and only requires a single burner while delivering heat to two or more stages. The blower and insulation requirements are kept minimal by using a by-pass air approach to deliver the correct stoichiometric air to fuel ratio internally, while providing cooling and extra mass flow rate with the bypass air. The net benefit of this burner system is the thermoacoustic power device can achieve significantly higher efficiency as current μ-CHP options, comparable or better than the efficiency of power deliver over the electrical grid by utility companies.

According to one embodiment, the burner system for a new μ-CHP technology is based on multistage thermoacoustics that can achieve the efficiency (and higher) and maintenance-free operation of a free-piston Stirling but at a much lower production cost. More specifically, this invention utilizes a passively controlled burner system for a multistage regenerator engine to achieve better performance and lower operating cost. The significance of this simple burner system is the high efficiency, reliability, and long maintenance free life. This burner system enables the use of the higher heating value of fuel.

According to another embodiment, the burner system is capable of operating at high temperatures, exceeding 1900° C. by using ceramic materials. The burner mixes air and fuel in the combustion region, and is capable of producing a heat flux from less than 1 kW to 10 kW and more. By not pre-mixing the air and fuel the incoming air can be heating to a high temperature, much above the 500-600° C. where spontaneous combustion would occur in a pre-mixed burner configuration. At temperature above approximately 1600-1700° C., the flame becomes invisible requiring novel flame detection techniques, described herein.

The burner by itself, however, does not produce the correct heat flux for use in the thermoacoustic power device, and requires modification and a heat delivery system (HDS) that enables the designer to properly arrange for the temperature and heat flux to provide the right operating conditions for the thermoacoustic power device.

Referring now to the heat delivery invention, in one embodiment, the device includes two thermoacoustic stages; a stage includes a hot heat exchanger, a cold heat exchanger, a regenerator, and a thermal buffer tube though other components may be utilized as necessary. Moreover, the interaction of the thermoacoustic stages with the alternator and motor. The current invention encapsulates this multistage thermoacoustic engine, the actuators with which the thermacoustic device converts the acoustic wave into electricity and vice versa, and the burner system.

The current invention enables a single small burner to provide three basic functions:
  Convert the higher heating value of fuel to usable heat energy for the engine.
  Return a portion of the heat energy produced by the burner back to the incoming combustion air.
  Provide sufficient heat capacitance to enable smooth power level transitions.

The burner system uses a single burner to convectively deliver heat to each stage. A small blower serves to push or pull the air through a nozzle mixed burner. The hot air then blows over fins attached to each stage to convectively heat each section. Since the thermoacoustic power device has a stick shape the fin lengths can be tuned so a single burner systems delivers the correct amount of power. The burner is designed so that many types of fuel can be used, such as bio fuel, bio methane, propane, oil, natural gas, or diesel fuel. Alternatively, two burners can each provide the heat to one heat exchanger, with one or more recuperators to increase efficiency. The burners can be made out of ceramic material, or integrated with the heating fins and recuperator to provide an integrated heat delivery system.

The system is able to maintain stability and efficiency through three passive burner components within the HDS:
  A by-pass nozzle-mixed burner is used to ensure proper combustion of high temperature incoming combustion air.
  A cross-flow recuperator returns high temperature heat energy from the exhaust into the incoming combustion air. It also returns the vapor energy to the incoming combustion air via condensation.
  A two-stage fin assembly convectively removes heat from the exhaust air and conducts it into the engine. The fins are sized so the incoming air will deliver the correct amount of heat to each stage.

The channels of the recuperator can also serve as a catalytic convertor to clean NOx and CO from the exhaust. And a final air-to-water recuperator will remove any remaining heat from the exhaust.

In order to deliver a sufficient mass flow rate so that the temperature drop across the fins is acceptable, a higher than stoichiometric airflow is required. The burner will not function with too much combustion air so a portion of the preheated air is by-passed around the burner gas entrainment core and reintroduced into the furnace. This also serves to cool the walls, enhances mixing, and locally insulates. The cooler surfaces can then utilize standard insulation materials.

The blower and burner system is controlled with a standard single spark ignition and utilizes flame rectification detection. The cooler incoming combustion air is rotated about a shaft and the gas is mixed in the nozzle. The ignition and flame detection systems are located in the cooler region of the shaft, prior to full flame temperature, which occurs in the furnace.

Key benefits of this burner system approach are:
  Very high efficiency in delivering flame heat to inside the engine.
  Very high utilization of the incoming fuel since vapor energy is recovered in the recuperator.
  Single burner can be used without early fuel ignition from high air temperatures.
  Clogging of the burner ports is eliminated since the gas is never premixed at high temperatures.
  The vertical recuperator channels enable easy draining of the condensate while maintaining a cooler appliance wall temperature.
  Catalytic cleaning can be done within advantageous temperature ranges.
  Blower life is maximized by maintaining room temperature operation on the bearings.
  Power level can be varied by adjusting blower speed and natural gas nozzle pressure.
  Exotic materials are not required since bypass flow provides active cooling at surfaces. For example, metals and ceramic materials can be used.
  PVC plumbing can be used at the exhaust since nearly all burner heat is either conducted into the engine or the water cooling system.
  Long life is achieved because premix or catalytic burners are not used.

The higher heating value use of fuel increases the system efficiency by over 4 percentage points compared to using the lower heat value usage. And the recuperated exhaust enables nearly 95% of the heat to be used in the engine.

In an alternative embodiment shown in FIGS. 1A-1C, the two stages of the thermoacoustic power device can be heated by two separated HDS's 124a, 124b. Each stage (1120a, 120b) has a burner 126 coupled to a furnace that directs the heat of the combustion towards the fins. The burner is of the bypass kind described above. The flow over the fins is carefully adjusted by optimizing the bypass ratio and temperature of the incoming air. The hot air over the fins is funneled into a cross flow recuperator. The hot air 128 leaving the fins, after the heat has been delivered to the hot heat exchanger in thermoacoustic power device is input to the recuperator 130 from one side, and cold air 132 is flown into the recuperator 130 from another side. As a result, using a series of plate facilitating heat transfer from the hot exhaust gas to the cold inlet gas for the burner, the incoming air 134 to the burner 126 is preheated to approximately 800-900° C., so that the combustion in the burner, in conjunction with the bypass air, which is also elevated to 800-900° C. and can achieve a temperate of approximately 1400° C. to heat the fins to about 850° C. at the appropriate heat flux needed to operate the engine. Exhaust gas leaving the recuperator is further cooled down from approximately 150° C. to less than the Dew point of the flue gases. In that manner the heat of condensation can be utilized to preheat the incoming combustion air in a second recuperator. The second recuperator 136 condenses the water vapor in the exhaust gas, thereby creating water that can be drained out of the system. In this manner a very high efficiency HDS can be obtained, having efficiencies above 85%. The current state of the art for small burners and HDSs is not capable of providing over typically 50-60% HDS efficiency, which is defined as the heat delivered to the hot heat exchanger divided by the heat capacity of the gas. The higher efficiency described herein enables higher overall system efficiencies of the thermoacoustic power device, typically in the range of over 30% high heat value compared to typically 12% high heat capacity efficiencies for Stirling cycle engines. By having two HDSs (124a, 124b), each HDS can be optimized for the heat and temperature required for each amplifier stage in thermoacoustic power device. Each HDS has a separate blower and control system to manage the HDS as needed for providing electricity as demanded by the load, which may vary over time. Typically the hot heat exchangers are kept at a constant temperature by modulating the flame on-off or by staging the combustion gas and air in a controlled manner to manage the temperature needed for thermoacoustic power device. For example, during startup the flame is initially much colder than during equilibrium, because the incoming air is initially at room temperature. As a result the flame is typically much longer than during steady state operation at elevated temperatures, near 1400° C. The flame may then impinge on the fins, creating local hot spots that can lead to fin degradation. The flame length and location inside the HDS can be controlled by modifying the fuel and air flow rates, to provide a shorter and optimized heat delivery to the hot heat exchanger as the various components reach their particular operating temperatures. Staged burner control is desirable when materials properties demand careful temperature control in the fin and areas of the HDS close to the burner. The flame may be sensed by using flame rectification approaches, whereby an electrical signal is modified by the flame to allow detection, even if the flame is invisible, as would be the case with temperatures approaching 1700° C. and above. In this case, conductive materials such as SiC can be used in a flame rectification approach.

In another embodiment, one burner can be utilized to deliver heat to each stage by bifurcating the flow from the bypass burner to the fins in each stage. A flow flux rate can be modulated as needed through the use of valves, proportional throttling of blowers at the inlet or exhaust of each stage, by proper geometric design of the HDS, whereby the flow channels are chosen to provide the proper flow rates to each amplification stage in thermoacoustic power device. The air past the fins can then be used to recuperate the heat in one or more recuperators that preheat the incoming combustion and bypass air as described above. The recuperator(s) reduce the temperature to below the Dew point, or a second recuperator is used to recover the latent heat of condensation as described above.

In either of these embodiments the number of recuperators can vary from one or more to facilitate degrees of freedom in the design process and implementation.

The materials for the burner system are typically chosen to withstand high temperatures, such as ceramics, and the HDS is typically made of corrosion resistive metals such as described in an accompanying application for a ceramic burner system. The metals should provide excellent heat conductivity in the recuperators, being able to withstand temperatures typically in the range of 850-1000° C., and they must enable the use of cost effective mass production fabrication methods. Useful materials include Haynes 230, 602MA and similar metals having excellent strength properties, and they can withstand the high temperatures required for the HDS. Care must be taken to design the system such that differences in thermal expansion coefficients can be accommodated. In one embodiment ceramic gaskets are used to seal various components of the HDS. The HDS can be mounted around the main engine tube, and allows replacement of the burner, the flow channels and recuperator as needed for service.

The fins and HDS can be fused to the main engine tube or made replaceable. As the flanges of the tube are typically permanently connected to the thermoacoustic power device, a HDS that can be split is desirable to facilitate thermoacoustic power device assembly and field replacement.

Modifications of these embodiments can be made as required to achieve particular results, but which are covered by the invention as disclosed herein. These modifications are covered by the disclosures made in this patent application. For example, the number of burners and HDSs can be varied to accommodate space and heat delivery requirements, such as may be the case for more than two amplification stages in thermoacoustic power device.

In summary, the invention provides a high efficiency burner system that includes a combusting chamber generating heat that is transported to one or more amplification stages of thermoacoustic power device in such a manner that the hot heat exchanger is provided with heat required for amplification of the acoustic wave inside thermoacoustic power device. Excess heat is recuperated such that exhaust gas cooled to temperatures suitable for plastic PVC exhaust systems. A fan moves the hot air through the burner and recuperator system using a bypass ratio for the combusting system so that optimal combustion can occur while providing sufficient how gas for the hot heat exchangers.

Turning now to a multistage thermoacoustic μ-CHP heat pump, the embodiment includes a power system with no hot moving parts that produces electricity for the home, uses waste heat for domestic purposes, and drives a second thermoacoustic power device that acts as a heat pump. The present embodiment is a new μ-CHP technology based on multistage thermo acoustics that can achieve the efficiency and maintenance-free operation of a free-piston Stirling, but at a much lower production cost that has no hot moving parts and increased reliability. A combination of traveling and standing acoustic waves enables high efficiencies for generating electricity. The combined cooling, heating, and electrical thermoacoustic power device are referred to as CCHP thermoacoustic power device.

The basic operation of the technology is based on thermoacoustic resonator with electronic feedback. The principles of its operation is:

Create a small acoustic wave.
Use heat to amplify an acoustic wave.
Resonating that wave to further amplify it.
Use a second stage to amplify the wave further.
Use the mechanical energy from the amplified wave to produce electricity and drive a heat pump.
Feedback some of the energy to the input to make a new acoustic wave.
Repeat the process.

This is the first time a cascaded regenerator thermoacoustic device has used electronic feedback to create an engine that is ideal for use in a μ-CHP application and as a heat pump. The thermoacoustic power device technology allows for passive control over a range of power levels from the same engine geometry. This simplifies the electronics and creates a very stable generator capable of wide load variability.

Referring now to a multi-stage thermoacoustic device with plumbing interfaces. The multistage embodiment keeps the engine diameter small enough to fit within a kitchen cabinet even as the power increases. The multiple heat exchanger sections along the tube allow for more heat to enter the engine with smaller more efficient burning flames. Natural gas, water, air, and exhaust only require a single connection input/output because the natural gas heated air can be split and delivered at its intended locations; water will be slightly heated passing through the cooling jacket but has sufficient cooling capacity to be direct fed into the next stage; and the exhaust will exit appropriately due to the vertical orientation of the engine and blower power.

In further detail, the multistage thermoacoustic design oriented in a vertical configuration is sufficiently narrow and short to easily fit within a kitchen cabinet.

The construction details of the invention include the second heat pump thermoacoustic power device can be operated in parallel to the engine thermoacoustic power device. Both thermoacoustic power devices share the same piston spaces and operate at the same frequency. The heat pump thermoacoustic power device uses the mechanical energy produced by the engine to lift heat. This eliminates the need to first convert to electrical power, simplifies the combination of power, heating, and cooling. And results in a very small and low cost product.

The advantages of the present invention include, without limitation, that it is low cost to produce, operate, and improved reliability. It is easy to move these devices into a house facility, or office because they are relatively small and lightweight. The natural gas combustion can use a single burner while providing heating, cooling, and electricity. The length of the device can be made shorter because the engine and heat pump are in a parallel orientation. Multiple stages keep each tube diameter small enough to allow sharing of pistons.

In one embodiment, the present invention is a power system utilizing multiple regenerators in a single tube with electronic feedback that can also heat and cool a home, for example. It is packaged in a unique way to meet ASME pressure vessel codes that also maximizes its performance.

The benefits of the invention are significant, where electricity is generated by the utility and delivered to the home or business via the power grid, in combination with heating water for domestic and space heating as well as a separate air conditioning system.

The additional benefits are evident by considering for example, the electricity, heating and cooling needs for a 1500 ft$^2$, 2500 ft$^2$ and a 5000 ft$^2$ home. Based on average monthly temperatures, and the heating and cooling needs for these three different sized homes, the benefits of thermoacoustic power device producing 4 kW electrical power are substantial. A common way to compare the energy needs for these homes is to compare the fuel needs required to provide the energy required using electrical power from the grid, and conventional heating and cooling systems. The benefits for a 1500 ft$^2$, 2500 ft$^2$ and a 5000 ft$^2$ home are a reduction in the amount of gas needed, where it is assumed natural gas is used as the fuel, but the numbers are not significantly different for other fuels, by a factor of approximately 2.2, 2.9, and 4.0 respectively. Using a solar assisted thermoacoustic power device, as described herein, with a solar panel producing approximately 1 kW electrical power, the electrical efficiency increases and the fuel reduction ratios are increased to 2.3, 3.1 and 4.4, respectively. Pre heating the combustion air with solar heat increases the electrical efficiency by another 2-3%, as described herein. It is also understood that the same principles of operation of a thermoacoustic power device can be applied to larger systems for heating and cooling clusters of buildings, and commercial buildings with corresponding benefits in reduction of energy usage.

In addition, benefits are derived from not having to pump hot or cold air around the house, facility or commercial building. The CCHP thermoacoustic power device enables transport of a cooling fluid around the building in a small diameter pipe or conduit, thereby requiring less space and expense than a conventional hot/cold air ducting system would. Heat exchangers and a local fan provide the cool or hot air where required.

Additionally no refrigerant and associated compressor equipment are needed. The CCHP thermoacoustic power device combines heating, cooling and electricity generation into one compact unit that is quiet, light weight, and can be placed inside small spaces such as a kitchen cabinet or cellar. The overall system cost for providing all three energy demands is substantially lower than conventional approaches would require. The CCHP thermoacoustic power device can be controlled remotely via the internet, and can be combined into a network of CCHP thermoacoustic power device. A cluster of CCHP thermoacoustic power device can be located in a neighborhood and electricity, heat and cold fluid can be piped around the neighborhood using underground utility conduits already in place around the country or in new construction in designated conduits underground. The CCHP thermoacoustic power device can also operate independent of the energy grid and act as a local energy source for backup energy, electricity, heat and cooling, in cases of emergencies such as severe weather, flooding, fires or earthquakes.

The considerable benefits of combining heating and cooling into an integrated unit are particularly important when we consider energy savings. The combined system can both have high electrical efficiency, over 25% and a high percentage of Carnot efficiency, exceeding 40% of Carnot efficiency, for cooling.

In a further embodiment, two thermoacoustic power devices, one for electricity generation, and one for cooling, may be connected to the same motor, but two independent alternators, or vice versa, i.e. having two motors coupled to the two thermoacoustic power devices, but connected to one or more alternator.

This embodiment of the invention describes the first combined heat/power device based on multistage thermoacoustic technology, to which we refer to as the thermoacoustic power device. Here, the heat pump uses the acoustic power from the engine and avoids the need to first convert heat into electricity, followed by converting electricity into cooling, which is less efficient. The parallel thermoacoustic power device configuration allows for electricity, space heating, water heating, and space cooling within the same unit. It replaces furnaces, air conditioners, water heaters, and minimizes the need for grid-connected power. The product is quiet and can achieve system efficiencies several factors more efficient than conventional approaches.

The thermoacoustic power device technology allows for passive control over a range of power levels from the same engine geometry. This simplifies the electronics and creates a very stable generator capable of wide load variability.

The combination of multiple stages with electronic feedback enables the proper phasing of the pressure and velocity within each regenerator. In further detail, the nearly antiphase piston motion cancels vibration and eliminates the need for springs to achieve resonant oscillations of the pistons. The acoustic wave has a combination of traveling and standing waves to maximize the heat transfer from the regenerator into amplification of the acoustic wave. It is also optimized to maximize the performance of the electrical system.

Turning now to a thermoacoustic power device shown in FIGS. 1A-1C having two thermoacoustic stages (120a, 120b) having a heat exchanger 122 that includes a hot heat exchanger 122c, a cold heat 122a exchanger, a regenerator 122b, and a thermal buffer tube though other components may be utilized as necessary. The interaction of the thermoacoustic stages (120a, 120b) is with the alternator 106 and motor 102. The current invention encapsulates this multistage thermoacoustic engine, the actuators with which the thermacoustic device converts the acoustic wave into electricity and vice versa, and the control system with the actuators communicate with one another and to the end user.

The water cooling systems 124 (shown in FIG. 1C) provide active cooling of the rejectors and actuators. Two are used to provide a temperature gradient across the regenerators, one is used to cool the stage 2 thermal buffer tube wall, and two are used to keep the coils in the actuators cool. In addition, the electronics are cooled with this water.

The benefits of the invention are significant for both the consumer and the electric utilities. The consumer benefits from energy security, as the thermoacoustic power device can be operated independently of the electricity grid, or as part of a micro grid or it can be integrated into the electricity grid. Additionally, the thermoacoustic power device efficiency typically insures a lower cost per kWh in many states in the US. As the heat is being used for space or water heating the overall efficiency of energy use in the home, business or corporate building is improved over methods that employ conventional electricity from the electricity grid and conventional heating and cooling systems. When combined with a cooling option, energy reduction is significant over the use of conventional systems. For example, electricity delivered to the user in the US is on average over all sources of energy generating systems approximately 32% according to a study made by Lawrence Livermore National Laboratory. The thermoacoustic power device provides electricity at approximately the same electrical efficiency, but uses waste heat for water and space heating, making the overall device efficiency over 90%. When combined with a cooling option using a second thermoacoustic power device run in reverse, energy savings in terms of the amount of gas needed to generate the electricity, heat and cooling for a 1500 $ft^2$ home is approximately 2.2× smaller, with the accompanying reduction in greenhouse gasses and environmentally harmful exhaust products. The savings for a 2500 $ft^2$ home is 2.9× and for a 5000 $ft^2$ 4.0×. These improvements in energy savings are estimated for the Washington D.C. area, based on average temperature and demand needs in that area.

The thermoacoustic power device connected to the electricity grid provides benefits to the electricity utility. Having 125,000 4 kW thermoacoustic power devices connected to each other via a communications network and to the electricity grid provide 500 MW of power, equivalent to a typically coal or gas fired power plant. Whereas conventional power plants require large amounts of cooling water, exceeding often 100,000 s of gallons per hour, the thermoacoustic power device uses the waste heat to satisfy demand for space or water heating. A utility could control the power plants much like networked computers are used to carry out collaborative computing. As demand varies from home to home the electric utility could modulate the supply through the use of the connected the thermoacoustic power device. Costs for real estate approval processes for a new power plant could be significantly reduced. Additionally the cooling water of a conventional plant is often returned to large bodies of water or rivers thereby changing the ecology of the water ecosystem. The thermoacoustic power device has no such negative impact on the environment, with waste heat being used for domestic purposes, for example.

As a further benefit, the thermoacoustic power device could be used in electric or hybrid vehicles. A thermoacoustic power device running on natural gas, diesel, gasoline, biofuels, ethanol, or propane could be used to charge an electric vehicle such as electric boats, cars, trucks, planes, buses, thereby removing range anxiety in drivers of electric vehicles. As the thermoacoustic power device is very quiet, the thermoacoustic power device would not disturb the natural quietness of an electric vehicle. The thermoacoustic power device could be used in small and large trucks, trains, boats, and even electric airplanes such as drones and other airborne vehicles. The thermoacoustic power device can be scaled from typical 4 kW power levels to over 40 kW power levels by increasing the operating frequency of the acoustic waves, increasing the engine pipe diameter, lengthening the stroke of the motor and alternator, varying the operating pressure among other parameters. As a result the thermoacoustic power device output power scales favorably with increasing power, thereby enabling a lower bill of materials for commercial applications. Additional benefits include a long lifetime without maintenance, as there are no hot moving parts as is commonly the case in a Stirling engine.

In an alternative configuration, more than one thermoacoustic power device amplifier can be connected in parallel to one or more motor and alternator to provide higher power at high efficiency. Or a power and cooling system can be combined into one integrated unit, without the need to convert gas energy into electrical power for providing cooling, as is conventionally the case.

The current invention has advanced the state of the art by way of a new control and electronics methodology and architecture that increases stability, efficiency, and operational capability. This current architecture allows the system to run in an autonomous mode, powering its own acoustic source, or connected to outside power sources such as wind or solar. The electrical generation side of the device is isolated from the electronic load and is able to run at full or partial power, at full or partial electrical efficiency, on or off grid, and with or without a user load. Moreover, the system architecture allows for single or multiple electric to acoustic drivers, single or multiple acoustic to electric generators, and single or multi-phase operation.

FIGS. 1A-1C show a control system for Stirling and thermoacoustic devices that enables the system 100 to operate as if it is connected to a passive load regardless of load demand, grid connectivity, and additional energy sources. Referring in more detail to the current invention, is the control system 100 having single or multiple electrical to mechanical drivers 102, a Stirling or Thermoacoustic device 104, single or multiple mechanical to electrical generators 106, passive or dynamic tuning circuit 108, PFC or other isolation circuit 110 an electronic DC bus 112, load delivery and resistive balance circuit 114, and a motor drive circuit 116.

Figure 3A:
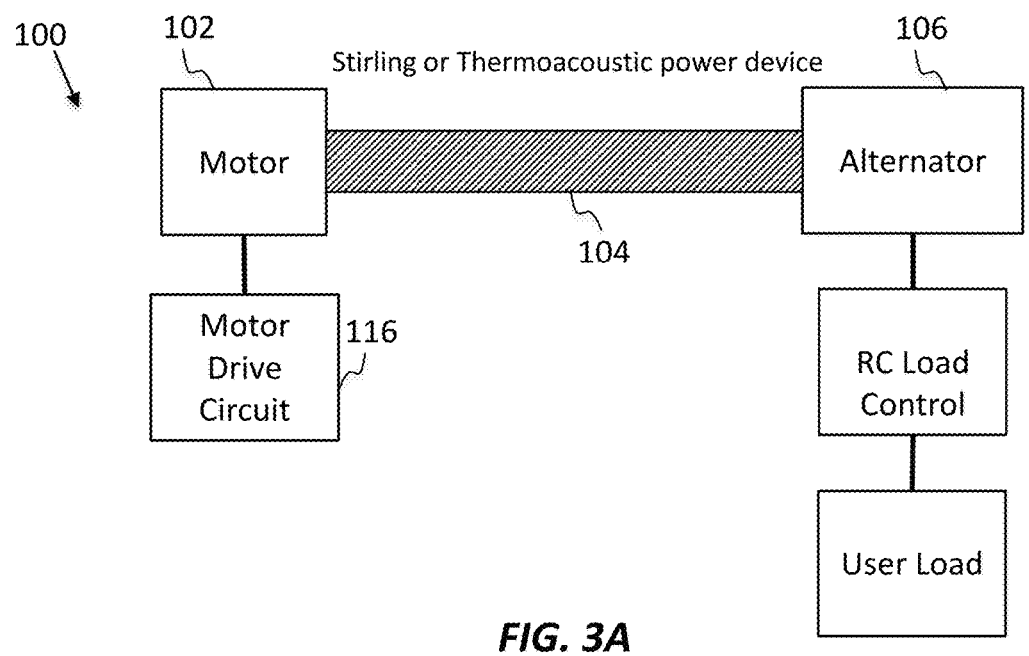
FIGS. 3A-3L show schematic drawings of different electronic configurations of the Stirling or thermoacoustic power device integrated with: (3A) RC load control, (3B) feedback capacitor, (3C) V/I phase adjust, (3D) power grid, (3E) tuning circuit and battery, (3F) tuning circuit and current reducer, (3G) RC control, (3H) tuning inductor, (3I) power factor correction, (3J) DC bus, (3K) grid inverter and AC boost converter, and (3L) a rectifier/boost converter, according to embodiments of the invention.
Figure 3B:
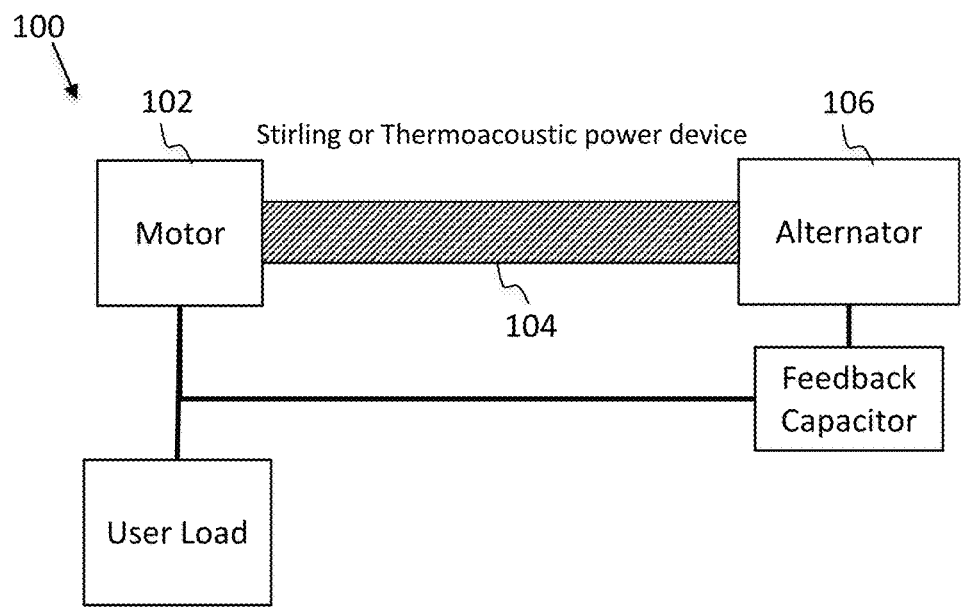
Figure 3C:
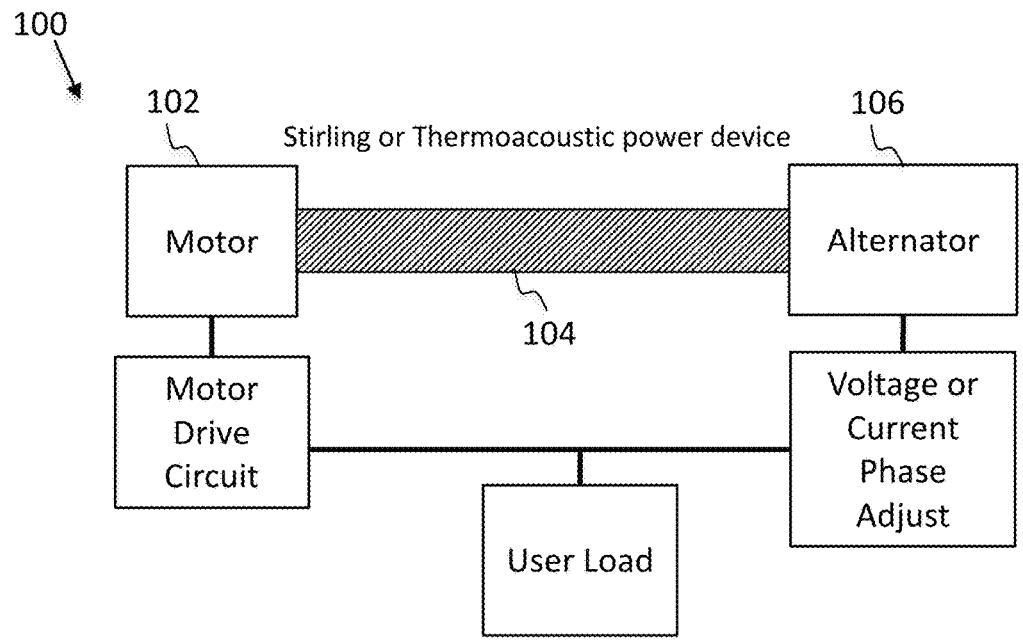
Figure 3D:
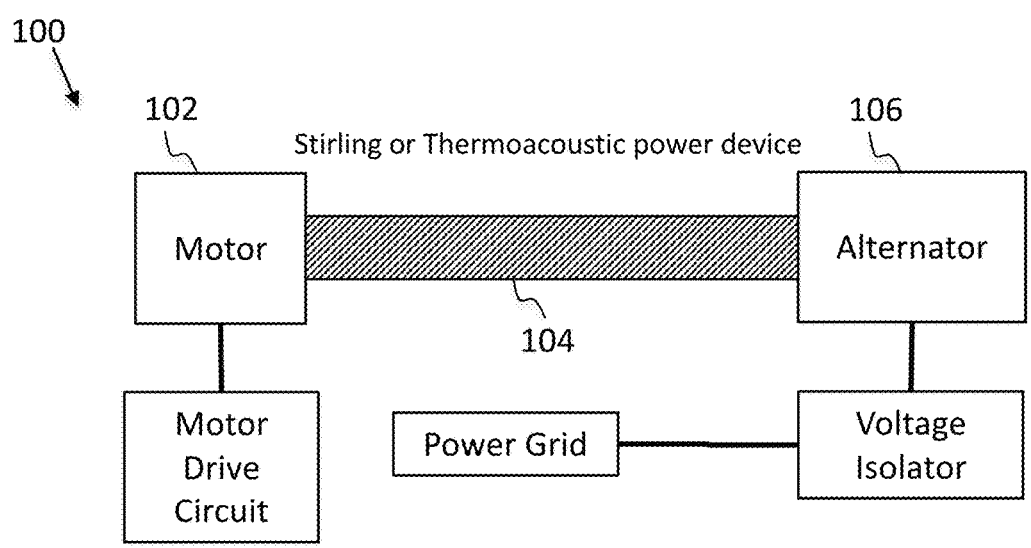
Figure 3E:
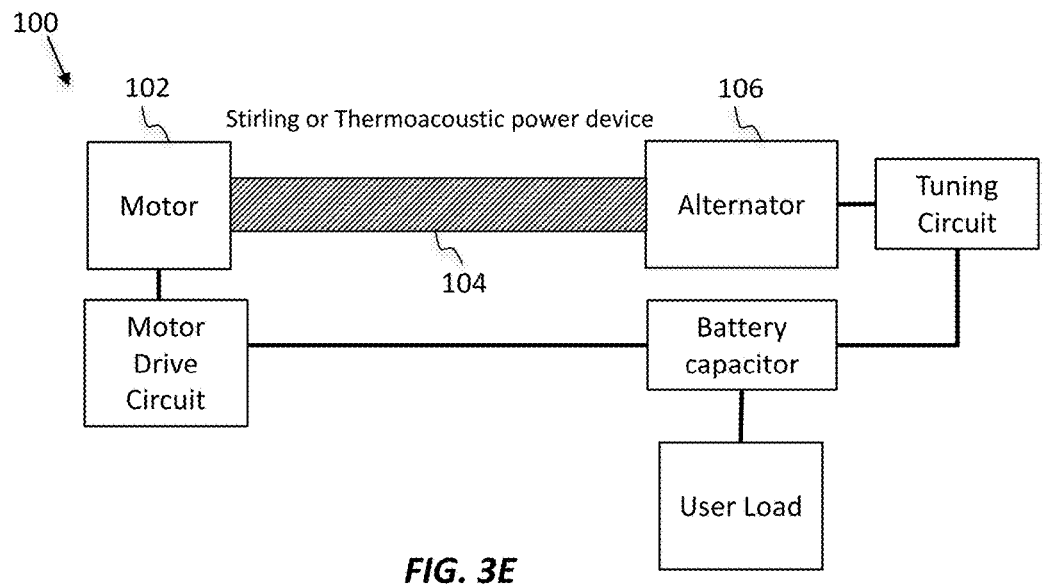
Figure 3F:
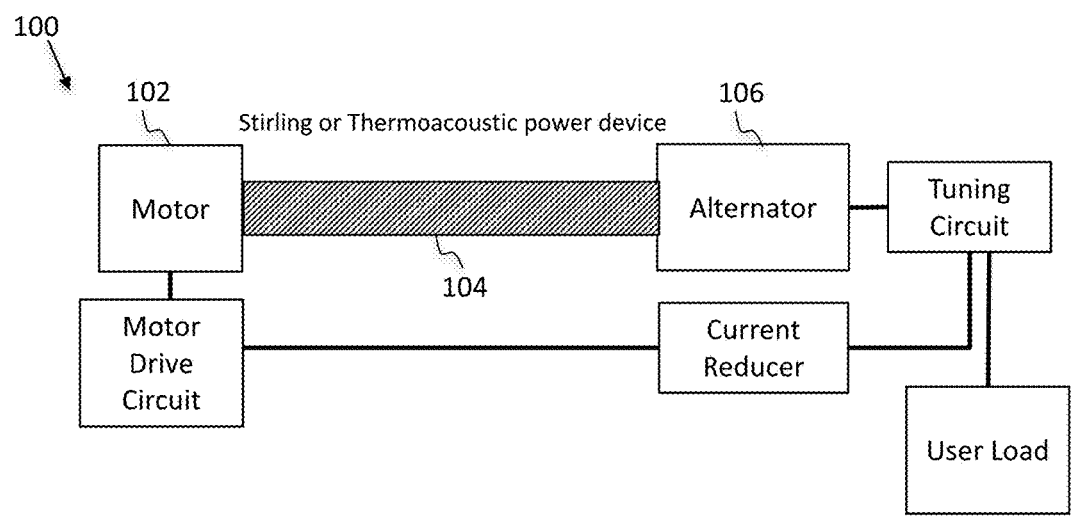
Figure 3G:
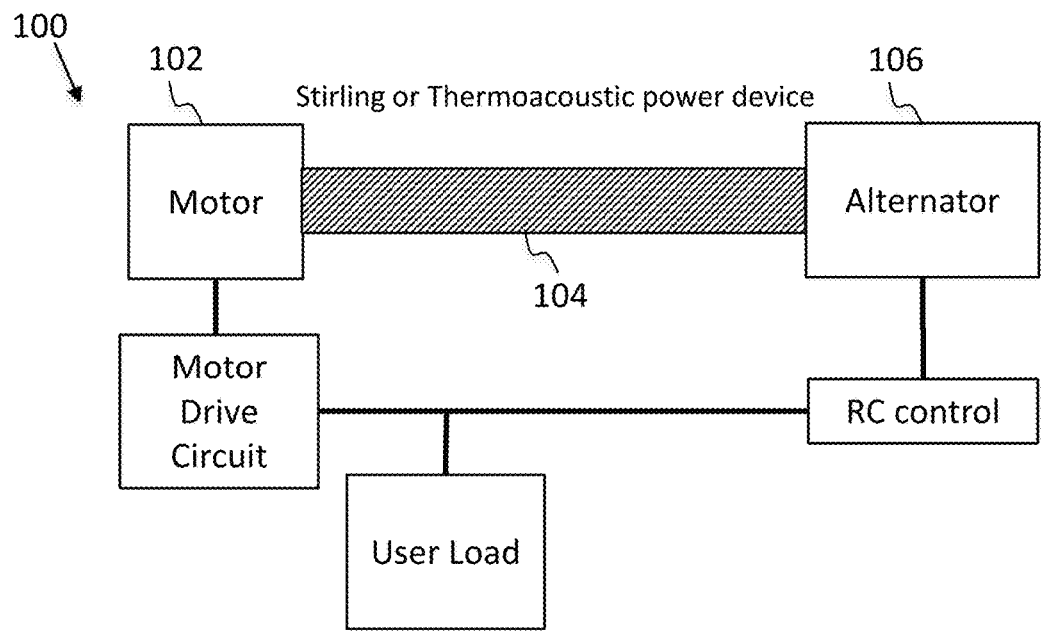
Figure 3H:
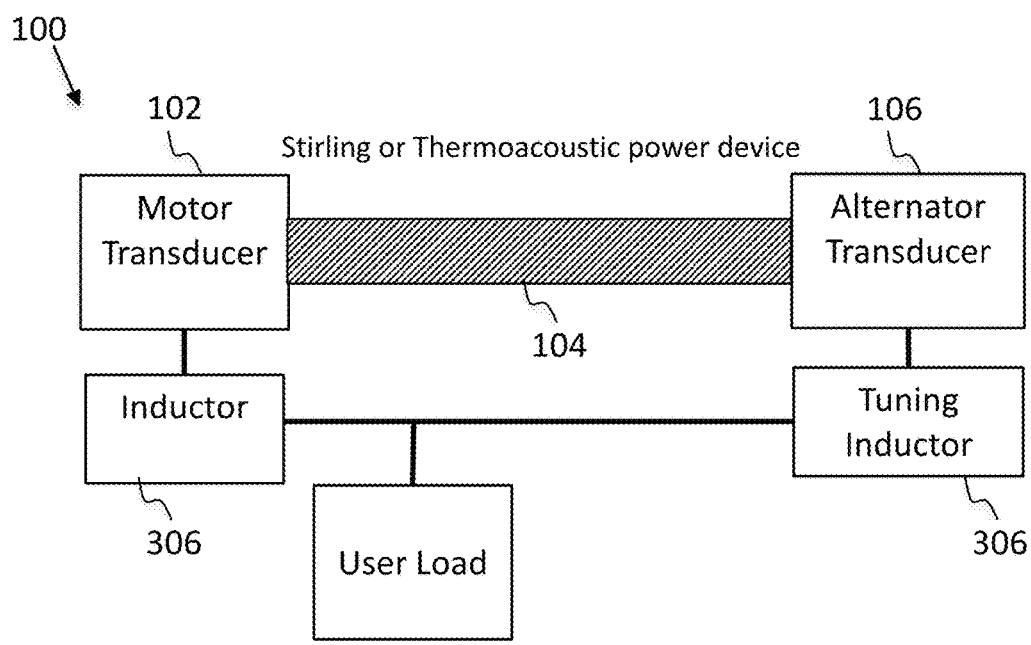
Figure 3I:
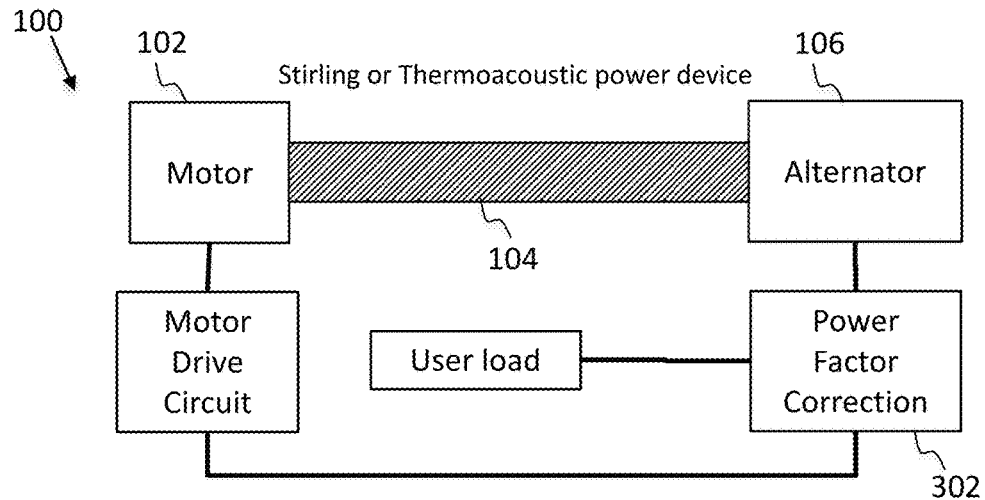
Figure 3J:
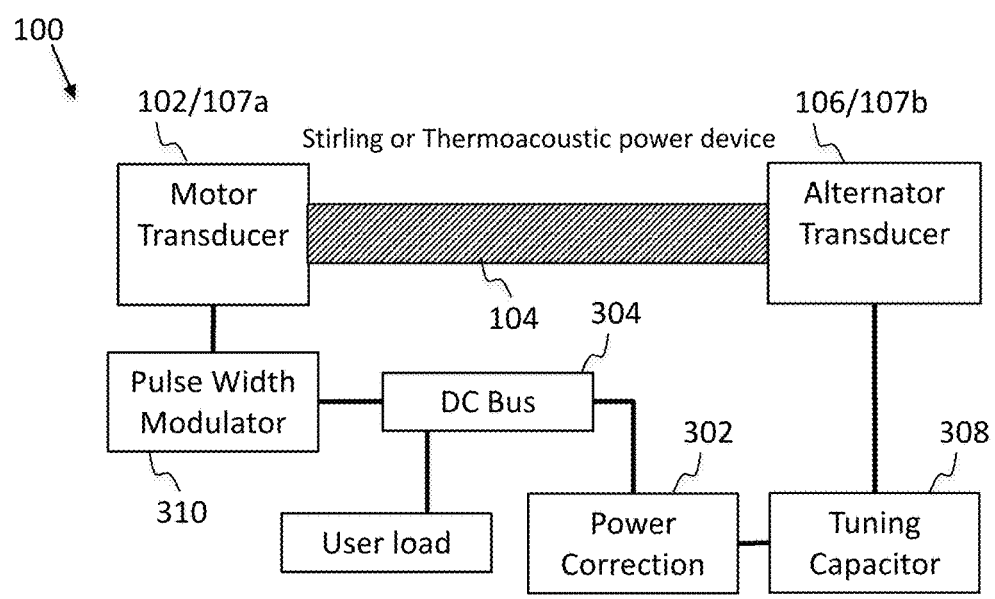
Figure 3K:
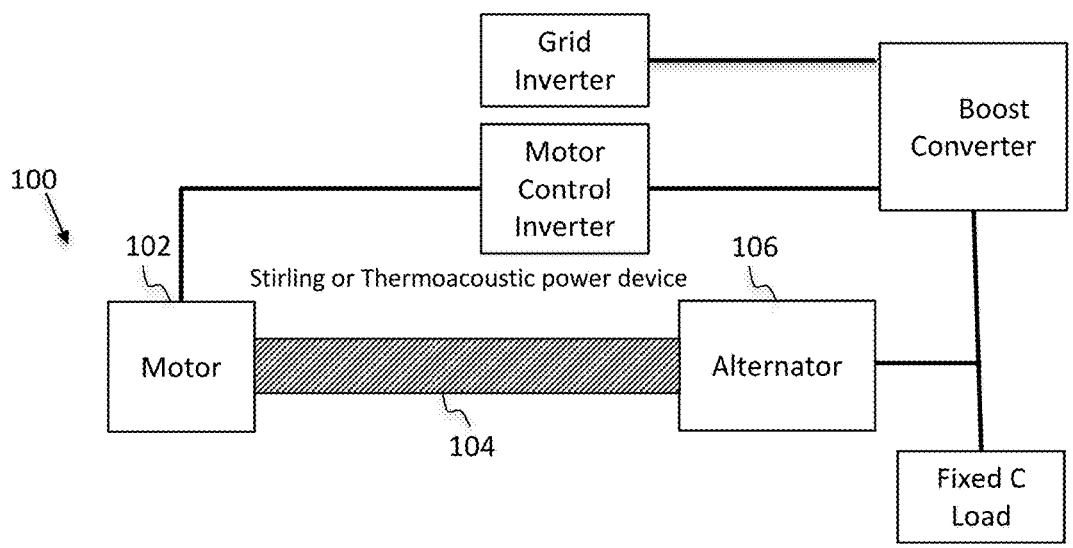
Figure 3L:
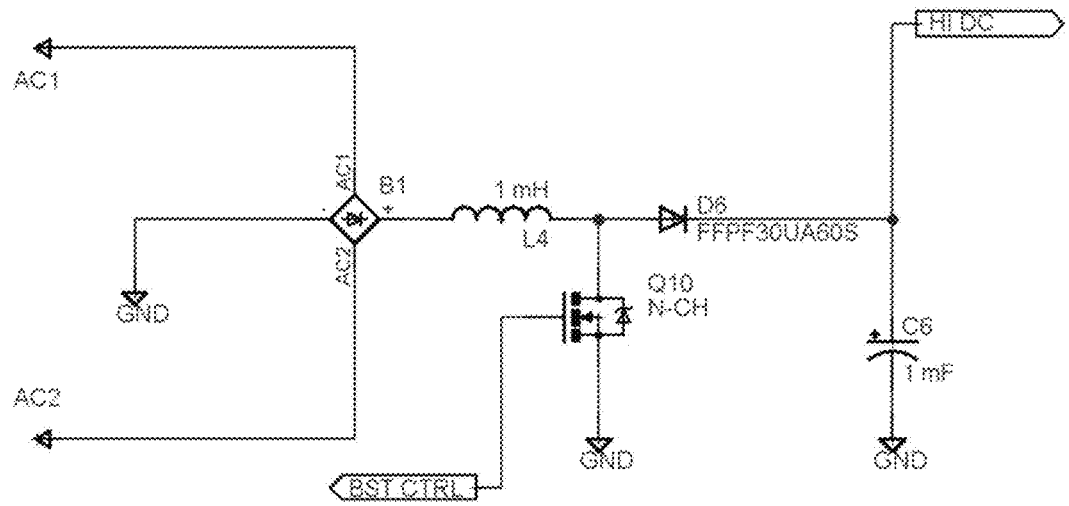

According to another aspect, the invention as shown in FIGS. 3A-3K is further configured to use a power factor correction circuit 302 to power a DC bus 112 (see FIG. 3J). In another aspect, operations such as providing power for maintaining motor operation, providing user load power, and powering system peripherals are configured to provide an invertor or pulse width modulation directly through DC power or reinverted to AC power through an appropriate frequency and voltage amplitude required by the user load. In another aspect, FIG. 1A shows the DC bus 112 includes power inserted from power sources 118 that can include a photovoltaic panel, a wind turbine, battery, or a hydroelectric system. In a further aspect, FIG. 1B and FIG. 3.1 show the motor 102, the alternator 106, or the motor 102 and the alternator 106 include a plurality of transducers 107a/107b respectively. Here, the motor, the alternator, or the motor and the alternator have elements that can include a single piezoelectric, a linear reciprocating transducer, a rotary transducer, a magnetostrictive transducer, or a magnetohydrodynamic transducer. In yet another aspect, FIG. 3H shows the motor 102, the alternator 106, or the motor 102 and the alternator 102 include a piezoelectric transducer and an inductor 306, where the piezoelectric transducer and the inductor 306 are configured to electrically tune a piezoelectric resonant frequency. According to another aspect, FIG. 3J shows the invention further includes a tuning capacitor 308, where the tuning capacitor 308 is configured for use by the motor 102 to enhance efficiency of an LRC circuit (not shown) of the motor 102, where the tuning capacitor 308 is configured to provide electrical reactive power for tuning mechanical operation of the thermoacoustic power device 104. In yet another aspect, a tuning capacitor or an inductor is configured to be electronically simulated by phase adjusting a voltage and a current according to a desired phase angle of the thermoacoustic power device 104.

As electrical power is delivered from the device, a tuning circuit is implemented for several reasons; maintaining proper end to end phasing within the device, ensuring generator acoustic impedance matching to the Stirling or thermoacoustic device, or shifting device phase to change power to heat ratios and device efficiency. The tuning circuit may be a passive capacitive or inductive circuit as well as a dynamic capacitive or inductive circuit able to adjust phasing.

The power path then leads to the isolation circuit, which may be implemented with a PFC circuit 302. The AC power that exits the device is converted to direct current (DC) in the PFC circuit 302, and all load interaction upstream is then equivalent to a resistive load. Here the power path may split to multiple loads through a DC bus 304, as shown in FIG. 3J, which may also utilize a buck or boost circuit to raise or lower voltage for the individual load paths, including the electrical to mechanical driver. In order to provide power to the electrical to mechanical driver through the power path, the power must be reinverted to AC, which is done through a pulse width modulation (PWM) circuit 310. In order to increase efficiency of the PWM conversion, the duty cycle is chosen which best suits the device, including a square wave signal. Moreover, frequency and amplitude of the driver signal may be varied to optimize performance of the device or vary power output. The motor drive circuit 116 may also contain provisions for providing all or a portion of the required motor power from an external source such as solar or wind energy. External power is converted to a usable DC voltage and fed into the DC bus increasing overall system usable power and efficiency.

The load path as the load delivery and resistive balance circuit can include several individual circuits and functions to balance the resistive portion of the load seen by the device as well as to convert the DC power into a usable form such as 60 Hz 110 VAC for applications in the United States or 50 Hz 220 VAC for applications in Europe and elsewhere. Contained within this circuit is the ability to divert all, a fraction or no power to an internal load so that the device sees a constant, or controlled load. The load delivery and resistive balance circuit also contains electronics for grid connection, anti-islanding, and routing power to a user interface contained on the device itself enabling the device to be used for on or off grid applications.

In another aspect, FIG. 3I shows the invention is further configured to use a power factor correction circuit 302 where the power factor correction circuit is configured to isolate an alternator 106 of the thermoacoustic power device 104 from a user load 312 by simulating all the user loads as a single resistor, where the power factor correction circuit 320 is configured to isolate power of a motor 102 of the thermoacoustic power device 104 from an alternator 106 of the thermoacoustic power device 104, where phasing of a motor piston 105 of the thermoacoustic power device 104 (see FIG. 1B) is decoupled from the reactive load on the alternator 106. Here, FIG. 3J shows the invention is further configured to use a tuning capacitor 308 disposed between power from the alternator 106 and the power factor correction circuit 302, where reactive power is provided to electrically enable mechanical resonance, where tuning the phasing between the alternator and motion of the motor pistons of the thermoacoustic power device is enabled. In another aspect, the invention is further configured to utilize a pulse width modulator 310 to generate an electrical signal for the motor power output and to adjust electrical properties selected that can include amplitude, phase, and frequency according to user load requirements. In another aspect, the invention is further configured to electronically maintain a constant resistive load on the alternator regardless of upstream power demand. According to another aspect, a component of the thermoacoustic power device includes a plurality of transducers 107a/107b (see FIG. 1B), where the component can include a motor and an alternator of the thermoacoustic power device. In another aspect, the component of the thermoacoustic power device includes an element such as a single piezoelectric, a linear reciprocating transducer, a rotary transducer, a magnetostrictive transducer, and a magnetohydrodynamic transducer. In yet another aspect, the motor, the alternator, or the motor and the alternator include a piezoelectric transducer and an inductor, where the piezoelectric transducer and the inductor are configured to electrically tune a piezoelectric resonant frequency. According to another aspect, the invention further includes a tuning capacitor, where the tuning capacitor is configured for use by the motor to enhance efficiency of an LRC circuit of the motor, where the tuning capacitor is configured to provide electrical reactive power for tuning mechanical operation of the thermoacoustic power device. In another aspect of the invention, a tuning capacitor or an inductor is configured to be electronically simulated by phase adjusting a voltage and a current according to a desired phase angle of the thermoacoustic power device.

One embodiment uses a RC load to properly phase adjust the piston. A second variation utilizes feedback capacitors to return phase-adjusted power from the alternator to the motor. The current invention enables small, low cost power electronics to provide three basic functions:

Convert higher frequency engine output to correct load frequency.

Return a portion of the electrical power produced by the alternator back to the motor.

Provide sufficient capacitance/compliance to control the piston phasing for maximum power.

While other μ-CHP systems require fixed electronic loads or complex control systems, the inherent stability of the thermoacoustic power device according to the current invention enables operation at varying loads and power levels while maintaining high efficiency, with a passive control system.

The system is able to maintain stability and efficiency through three passive circuit components within the control system:

A tuning capacitor is used to ensure proper voltage and current phasing within the alternator, and also maintains mechanical resonance on the alternator side of the engine by ensuring proper phasing of pressure and velocity of the acoustic wave at the alternator interaction point.

A feedback distribution circuit having a capacitor, load resistor, and comparator circuit handle load shifts and split alternator output power between the motor feedback and user load. Moreover, this capacitor ensures a proper phase shift between the alternator and motor. The user load portion of the power is converted to the appropriate voltage and frequency for either direct use or grid-tied applications.

A tuning capacitor is used to ensure proper voltage and current phasing of the power driving the motor, and also maintains mechanical resonance on the alternator side of the engine by ensuring proper phasing of pressure and velocity of the acoustic wave at the alternator interaction point.

The rectifier and boost convertor enable the isolation between the high frequency engine voltage and the grid connection.

The current controller is responsible for modulating the power output from the engine. It briefly adds or subtracts current to/from the motor to adjust the engine's power output.

It uses a capacitor that is normally isolated from the motor lines and charges while the engine is operating. At the proper point in the cycle, the capacitor is discharged to provide more current to the motor. Or if the engine needs to produce less power the current reducer in is employed.

Another embodiment includes the thermoacoustic power device digital feedback control approach that eliminates phase delay electric feedback with passive RC control for piston phasing and digitally controlled inverter motor power feedback for adjusting power level and transient operating conditions.

Two previous implementations to control piston relative phasing are discussed below. This is still an RC load, but with the "R" replaced by the boost convertor and inverter.

Here, two inverters—one for grid connection and the other for engine control integrated are on a single board. The engine control inverter is programmed to operate according to a desired mode. The natural inertial forces surrounding the alternator piston are used to get resonance and proper phasing.

One embodiment utilizes a standard rectifier circuit with a filtering capacitor chosen to match the required spring stiffness of the engine alternator. The DC current then flows through a forward-biased diode into a buck/boost convertor. The duty cycle of the switch determines the voltage at the load. The load is sinusoidal pulse width modulation full bridge current type inverter.

With a control strategy is provided that includes the rectifier provides a DC voltage that varies from 250 V to 500 V in a 1 kW engine and the buck/boost convertor will adjust that output voltage for the motor feedback loop. The majority of the power goes to the grid inverter with voltage adjustment. The feedback inverter and buck-boost convertor are digitally controlled from a small programmable microprocessor to enable load following and transient operations. The motor amplitude of the thermoacoustic power device is adjusted by digitally controlling the inverter driver signal. Since the alternator always sees the optimal impedance the proper phasing of the pistons is maintained without the need for complicated phase delay feedback.

Benefits of the current invention are numerous and significant. The electronic feedback allows adjustments in power output in direct response to demand changes. For example, the electrical output can be increased or decreased by changing the stroke of the motor. This can be achieved within one cycle of the acoustic oscillation. For a 120 Hz acoustic modulation, this change can be achieved in approximately 8 msec. As a result when demand varies, the thermoacoustic power device can respond almost instantaneously. This is an important feature for demand response which cannot be achieved with a conventional Stirling type system. Prior art Stirling engines are mechanical systems where the resonance or operating acoustic frequency is set by the geometry and the gas used in operation. Additionally, the electronic feedback system provides flexibility in adjusting the ratio of heat to electricity. By varying the phase angle between the motor and alternator, the efficiency of generated electricity can be varied almost from 0% to the maximum achievable efficiency, and can be changed within one acoustic cycle, or for a 120 Hz system in approximately 8 msec. When combining a number of the thermoacoustic power device into a networked environment for both control and electricity delivery, the flexibility of operating the thermoacoustic power device over a wide range of operating conditions is of significant importance to operators of the connected thermoacoustic power device, just as they are to the individual thermoacoustic power device user. When demand for heat and electricity change during the day, and from day to day during the four seasons, the thermoacoustic power device can respond quickly and efficiently due to the flexible feedback architecture. These benefits are significant improvements over the prior art devices and systems. The burner of the thermoacoustic power device allows almost instant response to demand changes. The burner can be turned down from, for example 25 kW to less than 0.8 kW almost instantaneously. This allows the control system to quickly respond to more heat demand for a certain amount of electricity produced. The excess heat can be used for instantaneous heating as might be required for instant hot water systems similar to combination boilers for domestic use. As a result the thermoacoustic power device system is a flexible energy appliance that can quickly respond to demand changes, and can modify the amount of heat, cooling and electricity that is required at any given time.

A computer or mobile device application for controlling and managing the heating, cooling, electricity and storage assets such as a hot water storage tank or a battery or solar panel is described herein. The electric feedback system allows convenient and almost instantaneous control over the thermoacoustic power device, and can be controlled over a communication network, typically one with improved security. The electronic feedback control enables not only quick modification of operating conditions, but allows efficient scaling of the thermoacoustic power device performance. The thermoacoustic power device electrical power output can by increased from the typical 4 kW to over 40 kW using a similar architecture. As an added benefit, the thermoacoustic power device cost per kWe reduces significantly. Additionally, by measuring home or business energy use, the thermoacoustic power device can optimize energy delivery through a control system that incorporates inputs from weather sensors, electric usage sensors for appliances, information about occupancy of homes and offices, market inputs for fuel and energy markets, and futures as described in an accompanying application.

The thermoacoustic power device digital feedback control approach eliminates phase delay electric feedback, with passive RC control for piston phasing and digitally controlling inverter motor power feedback for adjusting power levels and transient operating conditions.

Turning now to integration of renewable energy sources. The current invention improves efficiency and reduces harmful exhaust gases by using solar, or wind, or electricity from other sources to assist the thermoacoustic power device. Solar radiation is used to provide electricity through the use of solar photovoltaic or other solar-to-electricity conversion techniques to the engine. Typical solar systems require significant auxiliary structures to mount the solar panels, and electronics to convert DC power into AC power that can be used to power appliances and for other domestic or business use. Although the cost of photovoltaic power is coming down over time, installation costs remain relatively fixed and high. As a result the return on investment for solar power typically significantly exceeds ten years, longer than the average time a US homeowner stays in the same dwelling. By combining solar photovoltaic power with the thermoacoustic power device, the cost for the photovoltaic power infrastructure can be made significantly smaller, making the combination more economically attractive. Additionally, since only a few panels are required, more homes and businesses are able to install solar photovoltaic power on small roofs or within small areas. Solar produced electricity can be injected into the feedback loop, or DC bus, thereby significantly increasing the overall efficiency for electricity conversion as well as heating and cooling compared to the case without solar assisted thermoacoustic power device.

According to one embodiment, the invention improves the efficiency of the thermoacoustic power device for both electricity generation, and heating and cooling by using solar generated heat to assist in the delivery of heat to the hot heat exchangers.

In another aspect, the invention uses solar generated heat and electricity in combination to improve the efficiency of the thermoacoustic power device for electricity generation, heating and cooling, compared to the thermoacoustic power device without solar electricity and heating assist.

By providing solar electricity and solar heat to the thermoacoustic power device, efficiency of electricity generation and heating and cooling can be increased over the case where a single source of energy such as natural gas, propane or oil is used. Additionally, the use of solar generated electricity and heat reduces the quantity of harmful exhaust gases such as $CO_2$ and $NO_x$.

According to one embodiment, the basic operation of the thermoacoustic power device engine includes a stainless steel tube with a linear electric motor on one end and a linear electric alternator on the other. These components are sealed to the tube, which is filled with Helium at a pressure of, for example, 400 psi to allow acoustic signals to propagate from the motor to the alternator. The tube is fitted inside with a two-stage heat engine that operates on a Stirling cycle. Under normal operation, each stage of the heat engine provides a power gain of 2-3 for acoustic signals that are passing along the tube from the motor to the alternator.

Driving the motor with a sinusoidal electric current generates the acoustic signals. This causes the piston of the motor to oscillate sinusoidally, launching a generally sinusoidal acoustic wave along the tube. This wave is amplified by a factor of 2-3 as it passes through the first stage and another factor of 2-3 as it passes through the second stage. The result is that the alternator receives an acoustic signal with 4-9 times the power of the signal created by the motor. The alternator converts this acoustic signal to electric power at approximately 80-90% efficiency.

As a specific example, if the motor is supplied with a signal having an input power of 250 W, the alternator output will be 250 W*90% efficient motor*6×gain**90% efficient alternator=1215 W. Feeding 250 W of this output back to the motor to launch another acoustic wave can then create a steady state operation; and 965 W of the output is available in steady state for external use in the home.

In addition to this electrical output, heat is taken from the machine in the cooling portion of the Stirling cycle by means of circulating water. The temperature of the water emerging from the machine is normally in the range of 50° C. The machine puts out approximately twice as much heat compared to electricity; and if electric and heat outputs are combined, the engine is capable of converting more than 90% of the energy contained in the natural gas supplied to the machine into useful heat and electricity.

A solar photovoltaic panel with an area of 1.0 m² mounted in a plane perpendicular to the direction of the sun at noon at 40 degrees latitude will receive an input power of approximately 1,000 W on a clear day. Typical panels of current manufacture are capable of converting approximately 17% of this incident power to electricity, thus creating an output of 170 W. As this is a direct current, a power inverter is used to convert the DC output into an AC output suitable for home use or sale back to the grid when such is allowed. To be compatible with the electric grid, this frequency must be 60 Hz. However, inverters can be built to provide output power at other frequencies as well, a feature that is of use in this disclosure. For example, thermoacoustic power device machines may operate at internal frequencies of 120 Hz, so an inverter operating at that output frequency would be chosen for integration with the current thermoacoustic power device engine. Alternatively, DC power form the solar photovoltaic panel can be directly injected into the thermoacoustic power device feedback loop without the need for an inverter, further reducing capital expenditures for a μ-CHP system.

With these numbers in mind, it is clear that solar photovoltaic panels covering an area of approximately 1.5 m² will generate a maximum electric output power of approximately 255 W. Fed into an inverter with an output frequency of 120 Hz, the solar panels will then be capable of providing the power needed by the thermoacoustic power device machine motor to produce an electric output of approximately 965 W. However, none of this output power needs to be fed back to the input to create the steady state operating condition described above. The result is that by using solar energy to provide power at 120 Hz to the thermoacoustic power device power output is increased by 250 W, or about 26%. This can be used as additional energy in the home, or to reduce the natural gas input by 26% and still create the output of 965 W that the thermoacoustic power device machine would create if it were driven in its natural-gas-only mode.

This favorable condition will of course only be precisely true at noon. At other times of the day, the solar panels will produce less power, meaning that some of the power necessary to create a steady 1215 W output will have to come from the alternator and be fed back to the motor as in the basic operating cycle. If the solar panel is only producing a power of 200 W, for example early in the morning or later in the afternoon, then 50 W from the alternator output will have to be added to the power received by the motor to create the steady state operating condition; and the output power of the machine will then be 1165 W. Alternatively, more fuel would be needed to create 1215 W of output power. Basically, the addition of solar panels to provide input power for the thermoacoustic power device motor increases the output of the thermoacoustic power device engine by the amount of the power provided by the solar panels, making the overall system more efficient in its conversion of natural gas, propane or oil to electricity. Further, varying amounts of solar energy might be used to assist the thermoacoustic power device for varying improvements to the thermoacoustic power device efficiency over the case where no solar assist is employed.

It is noteworthy to realize that the amount of addition of solar generated electricity or heat is not linearly related to the overall efficiency of the system. For example, when comparing the efficiency of generating heat, cooling and electricity with the thermoacoustic power device, the overall efficiency increases above what would be the case if the heat or electricity generated by the sun would be directly injected into the output of the thermoacoustic power device, i.e. by feeding the electricity directly to the load or using the heat directly for domestic water or space heating, or by using electricity for cooling. The acoustic power amplifier in the thermoacoustic power device brings about this favorable condition.

In one embodiment, electronic controls in the feedback loop connecting the alternator to the motor are designed to add the power from the solar panels to that produced by the alternator so that a steady output power of, for example, 2,000 W is maintained. With such a feedback loop in place, the natural gas needed to produce a constant 2,000 W output will be reduced over the amount needed without the solar power input. In this situation, use of electricity produced by solar panels to provide input power for a thermoacoustic power device engine will reduce the natural gas, propane or oil needed for a constant electric output, meaning that for a given output, the system will burn less fuel and produce less pollution than the basic engine operating full time. The automatic adjustments provided by the feedback loop will also account for times during the day when cloud cover prevents the solar panels from generating maximum energy, and during the evening and night hours when little or no solar power is available.

Additional benefits are evident by considering the electricity, heating and cooling needs for a 1500 $ft^2$, 2500 $ft^2$ and a 5000 $ft^2$ home in the Washington D.C. area, as an example. Based on average monthly temperatures, and the heating and cooling needs for these three different sized homes, the benefits of the solar assisted thermoacoustic power device producing 4 kW electrical power using solar PV assist only are substantial. A common way to compare the energy needs for these homes is to compare the fuel needs required to provide the energy required using electrical power from the grid, and conventional heating and cooling systems. The benefits for a 1500 $ft^2$, 2500 $ft^2$ and a 5000 $ft^2$ home are a reduction in the amount of gas needed, where it is assumed here that natural gas is used as the fuel, but the numbers are not significantly different for other fuels, by a factor of approximately 2.2, 2.9, and 4.0 respectively. Using solar assisted thermoacoustic power devices, with a solar panel producing 1 kW electrical power, the electrical efficiency increases from 32% to approximately 40% and the fuel reduction ratios are increased to 2.3, 3.1 and 4.4, respectively. Pre heating the combustion air with solar heat increases the electrical efficiency by another 2-3%.

In another embodiment of the invention, electricity derived form other sources, such as the electricity grid, batteries, fuel cell, hydroelectric, wind turbine, or other source may be used to provide the feeedback power for the thermoacoustic power device. As the thermoacoustic power device amplifies the power to the motor, the overall efficiency for electricity generation improves similar to the example cited above. For example, a 1 kW injection of electrical power into the feedback loop to the motor provides a thermoacoustic power device efficiency for electrical power of approximately 41%. The electrical power fed into the feedback loop is properly frequency and amplitude adjusted to provide the proper electrical power to the thermoacoustic power device motor.

In a further embodiment, rechargeable batteries are used to supply the electric energy to the thermoacoustic power device machine necessary for it to create electricity for a home continuously. As an example, assuming the home is provided with batteries capable of providing approximately 7.7 kWh of energy before the batteries are completely discharged. Such a system can include 4 12 volt batteries connected in series, each having a total current rating to complete discharge of approximately 160 Ah. The battery system can directly feed DC power into the feedback loop of the thermoacoustic power device.

As noted above, for example a thermoacoustic power device machine being driven with an input power of 250 W is capable of producing a total output power of 1215 W. In normal operation of the machine, 250 W of this output is returned to the input to create a closed system that produces a continuous net output of 965 W. In the present embodiment, 250 W from the battery system are used to supply the electric energy necessary to drive the thermoacoustic power device machine. In this condition the thermoacoustic power device output is 1215 W. The result is that by using the battery system, an increase is provided to the thermoacoustic power device output by 250 W, or 26%. This additional energy can be either used in the home, or to reduce the natural gas input by 26% and still create the output of 965 W that the thermoacoustic power device machine would create if it were driven in its natural-gas-only mode. One of the benefits of this approach is to run the thermoacoustic power device at the optimal efficiency operating conditions as compared to using the electrical power directly for inversion into an AC source, thereby increasing overall system conversion efficiency.

Operating in this mode for 20 hours of a 24 hour day, the batteries will be discharged by an amount of 250 W*20 hours or 5 kWh. The batteries can be fully recharged by using the thermoacoustic power device machine for 4 hours operating with sufficient natural gas to produce an output of 1215 W. This will require a 26% increase in the natural gas required during the 4 hour charging cycle. The net result is then a reduction in natural gas usage by 26% for 20 hours of the day when the batteries are providing electric power to the thermoacoustic power device machine with a 965 W net output to the home, and an increase of natural gas usage of 26% in the 4 hour period when the thermoacoustic power device machine is creating the electricity with an output of 1215 W to fully recharge the battery system. The four-hour charging period can advantageously be chosen in the late evening or early morning hours when the electricity needs of the home are at their lowest point, and electricity is typically cheapest. A slight increase in the natural gas consumption will be necessary during this period to handle minimal electric needs of the home when the batteries are being charged.

The thermoacoustic power device augmented by auxiliary electric power from a secondary source provides potentially additional benefits to the user. In many parts of the US, electricity rates vary with the time of day, as demand varies. Typically electricity rates are highest at times of highest demand. Surcharges based on peak demand can be significantly higher than at night when rates are typically lowest. The thermoacoustic power device can be managed to reduce grid demand by using a small fraction of the grid power properly provisioned to be compatible with the feedback loop to the thermoacoustic power device electric motor. The thermoacoustic power device amplifies the electrical power thereby significantly reducing peak power demand. Of course, solar power or wind-generated power might be used as well, but solar power is not always able to be dispatched when needed.

Similarly, heat from secondary sources such as solar heating, nuclear energy, geothermal energy can be used to preheat water or combusting air to increase efficiency, lower production of green house gasses and reduce the environmental impact of electricity and energy needed for water heating and space heating and cooling.

Further embodiments and variations are described in U.S. Provisional Patent Application 62/083,666 filed Nov. 24, 2014, and U.S. Provisional Patent Application 62/083,660 filed Nov. 24, 2014, and U.S. Provisional Patent Application 62/083,812 filed Nov. 24, 2014, and U.S. Provisional Patent Application 62/083,628 filed Nov. 24, 2014, and U.S. Provisional Patent Application 62/083,633 filed Nov. 24, 2014, and U.S. Provisional Patent Application 62/083,642 filed Nov. 24, 2014, and U.S. Provisional Patent Application 62/083,648 filed Nov. 24, 2014, which are incorporated herein by reference in their entirety.

The present invention has now been described in accordance with several exemplary embodiments, which are intended to be illustrative in all aspects, rather than restrictive.

Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A method of responding to or controlling facility power requirements using a thermoacoustic power device, comprising:
   a. determining energy assets in a facility, wherein power requirements and a unique electrical signature of said energy assets are identified, wherein said energy assets comprise electrical appliances, heating appliances, and cooling appliances;
   b. responding to or controlling said energy assets using an appropriately programmed controller, wherein said controller controls said energy assets across a computer network, wherein said controller comprises a security system protocol;
   c. measuring usage of said energy assets using sensors, wherein said sensors comprise a temperature sensor or an electrical usage sensor, wherein said electrical usage sensor measures a load-response signal of an on/off operation of said energy assets, wherein said load-response signal identifies a specific energy asset by said controller, wherein said controller monitors energy usage of said energy assets, wherein said controller uses a monitored temperature, and said energy usage of said energy assets monitored by said controller to determine aggregate energy needs of said energy assets; and
   d. using said thermoacoustic power device to generate electricity and/or heat to said facility according to said monitored temperature, and said monitored energy assets, wherein said thermoacoustic power device is controlled by said controller, wherein a motor of said thermoacoustic power device receives an input signal to at least one motor transducer to create an acoustic wave in said thermoacoustic power device using a motor piston, where heat is input to said thermoacoustic power device from an external source and converted to acoustic energy through a first set of heat exchangers and a first porous media at a first stage of said thermoacoustic power device to amplify said acoustic wave and propagate said acoustic wave through a first open span in said thermoacoustic power device, wherein additional heat is input to said thermoacoustic power device from said external source and converted to additional acoustic energy through a second set of heat exchangers and a second porous media at a second stage of said thermoacoustic power device to further amplify said acoustic wave and propagate said acoustic wave through a second open span in said thermoacoustic power device, wherein mechanical energy from said further amplified acoustic wave moves a generator piston in a generator to convert said acoustic energy to electricity using at least one alternator transducer in said generator, wherein electrical output power of said alternator is tuned using a capacitance and a resistive load and is directed into a system to power electronics, wherein a portion of said electrical output power is used to drive said motor to create a subsequent acoustic wave to sustain power generation of said thermoacoustic power device, wherein excess electricity generated by said generator is disposed for power use, wherein said thermoacoustic power device is further tuned using the power electronics to provide more or less electrical power and heat that is dependent on user requirements.

2. The method according to claim 1 is further configured to use said electronics to tune and modulate said power and heat production of said thermoacoustic power device.

3. The method according to claim 1 is further configured to use a feedback capacitor to return phase adjusted power from an alternator of said thermoacoustic power device to said motor of said thermoacoustic power device.

4. The method according to claim 1, wherein said network is selected from the group consisting of an internet, an extranet, and an intranet.

5. The method according to claim 1 is further configured to use an electronic component selected from the group consisting of an impedance tuning component, a synthetic capacitor, and a physical capacitor, wherein said electronic component is configured to adjust voltage phasing and/or amplitude and current phasing of the power driving said motor of said thermoacoustic power device, wherein said electronic component maintains an optimized mechanical-electrical performance of said alternator near or at resonance of said thermoacoustic power device by appropriately phasing an electromechanical response to an acoustic impedance of a pressure and a velocity of an acoustic wave at an alternator interaction point of said acoustic wave.

6. The method according to claim 1 is further configured to use a voltage isolator to isolate a voltage of said thermoacoustic power device from a grid connection.

7. The method according to claim 1, wherein said appropriately programmed controller is further configured to modulate output power from said thermoacoustic power device, wherein said appropriately programmed controller controls electrical properties selected from the group consisting of current, voltage, phase, and frequency, wherein said appropriately programmed controller adds said electrical property to said thermoacoustic power device and subtracts said electrical property from said thermoacoustic power device to adjust said output power from said thermoacoustic power device.

8. The method according to claim 1 is further configured to use i) a capacitor, or ii) a battery, or alternatively iii) a capacitor and a battery that is normally isolated from power lines of said thermoacoustic power device, wherein said capacitor and said battery are charged while said thermoacoustic power device is operating, wherein said capacitor and said battery and periodically discharged to provide more current to said thermoacoustic power device.

9. The method according to claim 1 is further configured to use a current reducer when said thermoacoustic power device requires a reduced power output.

10. The method according to claim 1 is further configured to use a passive RC control for piston phasing of said thermoacoustic power device to eliminate electric feedback phase delay, wherein inverter motor power feedback is digitally controlled by said appropriately programmed controller for adjusting a power level and transient operating conditions of said thermoacoustic power device.

11. The method according to claim 1, wherein a component of said thermoacoustic power device comprises a plurality of transducers, wherein said component is selected from the group consisting of said motor and said alternator of said thermoacoustic power device.

12. The method according to claim 1, where the appropriately programmed controller is configured to identify a type of the energy asset using one of said sensors that is capable of integrating crowd source information to identify an energy asset make and model.

13. The method according to claim 1 further comprises a tuning capacitor, wherein said tuning capacitor is configured for use by said motor of said thermoacoustic power device, wherein said tuning capacitor enhances efficiency of an LRC circuit of said motor, wherein said tuning capacitor is configured to provide electrical reactive power for tuning mechanical operation of said thermoacoustic power device.

14. The method according to claim 13, wherein i) said motor, ii) said alternator, or iii) said motor and said alternator comprise elements selected from the group consisting of a piezoelectric transducer, a linear reciprocating transducer, a rotary transducer, a magnetostrictive transducer, and a magnetohydrodynamic transducer.

15. The method according to claim 13, wherein i) said motor, ii) said alternator, or iii) said motor and said alternator comprise a piezoelectric transducer and an inductor, wherein said piezoelectric transducer and said inductor are configured to electrically tune a piezoelectric resonant frequency.

16. The method according to claim 13, further comprising said tuning capacitor, wherein said tuning capacitor is configured for use by i) said motor, ii) said alternator, or iii) said motor and said alternator to enhance efficiency of said LRC circuit of i) said motor, ii) said alternator, or iii) said motor and said alternator, wherein said tuning capacitor is configured to provide electrical reactive power for tuning mechanical operation of said thermoacoustic power device.

17. The method according to claim 13, wherein said tuning capacitor or an inductor is configured to be electronically simulated by phase adjusting a voltage and a current according to a desired phase angle of said thermoacoustic power device.

18. The method according to claim 1 is further configured to use a power factor correction circuit, wherein said power factor correction circuit is configured to isolate said alternator of said thermoacoustic power device from a user load by simulating all said user loads as a single resistor, wherein said power factor correction circuit is configured to isolate power of said motor of said thermoacoustic power device from an alternator of said thermoacoustic power device, wherein phasing of said motor piston of said thermoacoustic power device is decoupled.

19. The method according to claim 18 is further configured to use a tuning capacitor disposed between a power from said alternator and said power factor correction circuit, wherein reactive power is provided to electrically enable mechanical resonance, wherein tuning said phasing between said alternator and motion of said motor pistons of said thermoacoustic power device is enabled.

20. The method according to claim 18 is further configured to utilize a pulse width modulator to generate an electrical signal for said motor power output and to adjust electrical properties selected from the group consisting of amplitude, phase, and frequency according to user load requirements.

21. The method according to claim 18 is further configured to electronically maintain a constant resistive load on said alternator regardless of upstream power demand.

22. The method according to claim 18, wherein a component of said thermoacoustic power device comprises a plurality of transducers, wherein said component is selected from the group consisting of said motor and said alternator of said thermoacoustic power device.

23. The method according to claim 22, wherein said component of said thermoacoustic power device comprises an element selected from the group consisting of a single piezoelectric, a linear reciprocating transducer, a rotary transducer, a magnetostrictive transducer, and a magnetohydrodynamic transducer.

24. The method according to claim 22, wherein i) said motor, ii) said alternator, or iii) said motor and said alternator comprise an inductor.

25. The method according to claim 22, further comprises a tuning capacitor, wherein said tuning capacitor is configured for use by said motor to enhance efficiency of an LRC circuit of said motor, wherein said tuning capacitor is configured to provide electrical reactive power for tuning mechanical operation of said thermoacoustic power device.

26. The method according to claim 22, wherein a tuning capacitor or an inductor is configured to be electronically simulated by phase adjusting a voltage and a current according to a desired phase angle of said thermoacoustic power device.

27. The method according to claim 1 is further configured to use a power factor correction circuit to power a DC bus.

28. The method according to claim 27, wherein operations selected from the group consisting of providing power for maintaining motor operation, providing user load power, and powering system peripherals are configured to provide an invertor or pulse width modulation directly through DC power or reinverted to AC power through an appropriate frequency and voltage amplitude required by said user load.

29. The method according to claim 27, wherein said DC bus comprises power inserted from power sources selected from the group consisting of a photovoltaic panel, a wind turbine, a battery, and a hydroelectric system.

30. The method according to claim 27, wherein i) said motor, ii) said alternator, or iii) said motor and said alternator comprise a plurality of transducers.

31. The method according to claim 27, wherein i) said motor, ii) said alternator, or iii) said motor and said alternator comprise elements selected from the group consisting of a single piezoelectric, a linear reciprocating transducer, a rotary transducer, a magnetostrictive transducer, and a magnetohydrodynamic transducer.

32. The method according to claim 27, wherein i) said motor, ii) said alternator, or iii) said motor and said alternator comprise a piezoelectric transducer and an inductor, wherein said piezoelectric transducer and said inductor are configured to electrically tune a piezoelectric resonant frequency.

33. The method according to claim 27, further comprises a tuning capacitor, wherein said tuning capacitor is configured for use by said motor to enhance efficiency of an LRC circuit of said motor, wherein said tuning capacitor is configured to provide electrical reactive power for tuning mechanical operation of said thermoacoustic power device.

34. The method according to claim 27, wherein a tuning capacitor or an inductor is configured to be electronically simulated by phase adjusting a voltage and a current according to a desired phase angle of said thermoacoustic power device.

35. The method according to claim 1, wherein power delivery to said energy asset is configured to be self-learning over a time-based period by said appropriately programmed controller, wherein said self-learning is according to a previously determined signature of said energy asset.

36. The method according to claim 35, wherein said self-learning comprises monitoring said energy asset to determine analytical information about energy loads from at least one power facility, wherein said power facilities are aggregated.

37. The method according to claim 35, wherein said self-learning is configured to predict potential failure modes of said energy assets and configured to take preemptive correction.

38. The method according to claim 1, wherein crowd sourced population data is used to identify outlier energy assets enabling the consumer to improve performance or take preemptive action to avoid potential failure modes.

39. The method according to claim 1, wherein outside temperatures and weather are monitored using said sensors controlled by said controller, wherein data of said outside temperature and said weather are received by said network.

* * * * *